United States Patent [19]

Harpell et al.

[11] Patent Number: 5,362,527
[45] Date of Patent: Nov. 8, 1994

[54] FLEXIBLE COMPOSITES HAVING RIGID ISOLATED PANELS AND ARTICLES FABRICATED FROM SAME

[75] Inventors: Gary A. Harpell; Dusan C. Prevorsek, both of Morristown; Max W. Gerlach, Hackettstown, all of N.J.

[73] Assignee: AlliedSignal Inc., Morristownship, Morris County, N.J.

[21] Appl. No.: 6,914

[22] Filed: Jan. 21, 1993

Related U.S. Application Data

[63] Continuation of Ser. No. 705,682, May 24, 1991, abandoned.

[51] Int. Cl.⁵ .............................................. F16B 2/00
[52] U.S. Cl. .................................... 428/33; 428/53; 428/76; 428/105; 428/109; 428/110; 428/113; 428/196; 428/246; 428/252; 428/284; 428/286; 428/902; 428/911; 2/2.5
[58] Field of Search .............. 428/53, 52, 76, 105, 428/109, 110, 113, 196, 246, 252, 284, 286, 902, 911, 33; 2/2.5

[56] References Cited

U.S. PATENT DOCUMENTS

| | | | |
|---|---|---|---|
| 3,894,472 | 7/1975 | Davis | 2/2.5 |
| 4,633,528 | 1/1987 | Brandt | 2/2.5 |
| 4,660,223 | 4/1987 | Fritch | 2/2.5 |
| 4,704,943 | 11/1987 | McDougal | 428/911 |
| 4,923,728 | 5/1990 | Snedeker | 2/2.5 |
| 5,187,023 | 2/1993 | Prevorsek et al. | 428/911 |
| 5,196,252 | 3/1993 | Harpell | 428/911 |
| 5,198,280 | 3/1993 | Harpell et al. | 428/911 |

*Primary Examiner*—James J. Bell
*Attorney, Agent, or Firm*—Gus T. Hampilos

[57] ABSTRACT

A flexible article of manufacture especially suitable for use as a ballistic resistant body armor which comprises one or more composite layers, at least one of said composite layers comprising a base layer having a plurality of planar bodies positioned between two sandwiching flexible layers out of contact with each other and a plurality of planar bodies positioned on a surface of said base layer out of contact with each other and in disalignment with the sandwiched planar bodies.

42 Claims, 11 Drawing Sheets

FLEXIBLE COMPOSITES HAVING RIGID ISOLATED PANELS AND ARTICLES FABRICATED FROM SAME

This application is a continuation of application Ser. No. 705,682, filed May 24, 1991, now abandoned.

BACKGROUND OF THE INVENTION

1. Field of the Invention

This invention relates to flexible composites and to articles fabricated from same having enhanced flexibility. A more preferred aspect of this invention relates to flexible composites and articles having improved protection against penetration by such threats as bullets, knives, ice picks, flechettes and the like.

2. Prior Art

Since the beginning of recorded history, a combination of rigid plates or panels affixed to a flexible backing, usually fabric or leather, has been used extensively as body armor in diverse areas of the world. (Charles Ffoulkes, *Armour and Weapons* Oxford at the Clarendar Press, 1909; H. Russell Robinson, *Armour*, London: Herbert Jenkins, 1967; A. M. Snodgrass, *Arms and Armour of the Greeks*, Cornell University Press, Ithaca, N.Y., 1967; Vesey Norman, *Arms and Armor*, G. P. Putnam's Sons, New York and Claude Blair, *European Armous*, The McMillan Company, New York, 1959. During the 14th century a cloth or leather garment lined with metal plates, known as a coat of plates, was the most widely used type of body defence. It appears that the plates were rectangular in shape and their arrangement prevented draping of the armor or flexing on the bias. Almost certainly, this armor limited the mobility of the wearer. A development from the coat of plates was the brigandine which remained in general use until the 17th Century. In the 15th century and later the brigandine consisted of a coat of plates made of small lames which could work over each other, thus producing flexible protection. A variant of the brigandine, the jack, (15th century) consisted of many small plates of iron or horn secured between layers of canvas by a trellis-work of stitches. A variant of the jack was the "pennyplate coat" and was constructed from small overlapping iron discs with each disc riveted to a canvas backing. (See Claude Blair, European Armour, The MacMillan Company, New York 1959).

Roy C. Laible, *Ballistic Materials and Penetration Mechanics*, Elsevier Scientific Publishing Co. Amsterdam Oxford-New York, 1980 describes an infantry vest utilizing 149 titanium plates attached to four layers of nylon ballistic fabric backing. The plates overlapped and incorporated three slits to allow them to slide, thus providing flexibility. The plates were rectangular or square in shape and appear to be curved in one plane.

U.S. Pat. No. 4,316,286 describes a bullet-proof plate assemblies, utilizing hinged plates, but such assemblies utilize relatively large roughly rectangular shaped panels. Such an approach is unlikely to lead to flexibility required for an infantry vest.

U.S. Pat. No. 4,559,251 describes a material for protective clothing which has been developed based on an assembly of hexagonal rigid plates. Although such a construction is an improvement over a single rigid panel it appears that the structure will have inherent limitations in flexibility, contrary to claims in the patent, which would limit its usefulness as infantry body armor.

U.S. Pat. No. 4,483,020 describes a ballistic vest which incorporates essentially square plates which interlock when flexed inward. It is claimed that such an arrangement reduces blunt trauma. A similar vest is disclosed in U.S. Pat. No. 4,660,223 which incorporates multiple titanium panels with each titanium panel to each other except by overlying and underlying felted material. In this disclosure, all panels appear to be based on square or rectangular considerations.

A design for body armor has been disclosed in U.S. Pat. No. 4,535,478 in which modular panels have been incorporated into a carrier garment. No unusual geometric considerations were disclosed.

Multiple plate body armor has been disclosed in U.S. Pat. No. 4,680,812 which allows flexibility but protects the body from hyper-extension, thus protecting against spinal injury.

Flexible body armor has been disclosed in U.S. Pat. No. 3,894,472 which has a central support sheet with the plates arranged in a checkerboard pattern. The pattern of the plates on one face are the reverse of the pattern on the opposite face. This approach claims complete coverage by rigid plates, coupled with appropriate flexibility.

An infantry body armor system has been disclosed in U.S. Pat. No. 3,557,384 which is claimed to provide protection against both fragments and small arms fire. This system uses a single plate on the front of the torso and a single plate on the back of the torso to provide protection against small arms fire. Relatively large plates may be utilized on a limited and specific portions of the torso.

A complex body armor system has been disclosed in U.S. Pat. No. 3,577,836 which incorporates multiple Telflon discs which are circular when viewed from the front but are elliptical in cross-section. It is claimed that the low coefficient of friction facilitates the deflection of projectiles and the elliptical cross-section minimizes the number of projectiles which can impact normal to the disc surface.

Ballistic articles such as bulletproof vests, helmets, structural members of helicopters and other military equipment, vehicle panels, briefcases, raincoats and umbrellas containing high strength fibers are known. Fibers conventionally used include aramid fibers such as poly(phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

U.S. Pat. Nos. 4,623,574 and 4,748,064 disclose a simple composite structure comprising high strength fibers embedded in an elastomeric matrix. The simple composite structure exhibits outstanding ballistic protection as compared to simple composites utilizing rigid matrices, the results of which are disclosed in the patents. Particularly effective are simple composites employing ultra-high molecular weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 4,650,710 discloses a flexible article of manufacture comprising a plurality of first flexible layers arranged in a first portion of the article, each of said first layers consisting essentially of fibers having a tensile modulus of at least about 300 g/denier and a tenacity of at least about 15 g/denier and a tenacity of at least about 15 g/denier and a plurality of a second flexible layers arranged in a second portion of said article, each of said second flexible layers comprising fibers, the resistance to displacement of fibers in each of said second flexible layers being greater than the resistance to displacement in each of said first flexible layers.

Other ballistic resistant articles are described in U.S. Pat. Nos. 4,916,000; 4,403,012, 4,457,985; 4,737,401; 4,543,286; 4,563,392 and 4,501,856.

SUMMARY OF THE INVENTION

The present invention relates to flexible composites and to articles of manufacture fabricated therefrom. The composite of this invention comprises one or more composite layers, at least one of said layers comprising a plurality of first planar bodies fixed on a surface of a first flexible layer or fixed between said first flexible layer and a second flexible layer such that each of said first bodies is isolated from and out of contact with each other of said first bodies forming a base layer having a pattern of filled regions formed from said first flexible layer and said first bodies or formed from said first and second flexible layers and said first bodies, and unfilled regions formed from said first flexible layer or said first and second flexible layers, and a plurality of second planar bodies on a surface of said base layer, or on a surface of a third flexible layer, or fixed between said third flexible layer and a fourth flexible layer such that each of said second planar bodies is isolated from and out of contact with each other of said second planar bodies and each of said first planar bodies, said second planar bodies positioned in correspondence and alignment with said unfilled regions of said base layer such that at least about 85 area %, preferably at least about 90 area %, more preferably at least about 95 area % and most preferably about 100 area % of said unfilled regions are aligned with said second planar bodies.

Another aspect of the invention relates to articles of manufacture fabricated totally or in part from the composite of this invention.

Several advantages flow from this invention. In general, the composite of this invention provides for a high degree of flexibility even though it includes substantial rigid portions. Furthermore, because the planar bodies or rigid areas are isolated, noise is minimized.

In those embodiments of the invention where the planar bodies are made of penetration resistant materials, and the composite or article is intended to provide penetration resistance, a high degree of coverage by the penetration resistant bodies is provided. Moreover, the composite or article of this invention exhibits relatively improved penetration resistance as compared to fibrous composites of the same areal density without unduly affecting the flexibility of the composite adversely. The use of the composite layer construction provides a high degree of versatility in the amount of overlap of first and second planar bodies to provide varying degrees of penetration protection. Furthermore, through use of the composite or article of this invention, relatively higher denier yarn can be employed in the manufacture of the various flexible layers of the composite or article of this invention without unduly affecting the penetration resistance of the composite or article. The penetration resistance properties of the composites or articles of this invention may be optimized such that the first and second planar bodies blunt sharp penetration threats such as flechettes, ice picks and the like to increase the effectiveness of any penetration resistant backing layer that may be used.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE PREFERRED EMBODIMENTS OF THE INVENTION

The preferred invention will be better understood by those of skill in the art by reference to the above figures. For convenience, the composite of this invention and the article of this invention are described in terms of certain preferred embodiments. The preferred embodiments of this invention illustrated in the figures are not intended to be exhaustive or to limit the invention to the precise form disclosed. It is chosen to describe or to best explain the principles of the invention and its application and practical use to thereby enable others skilled in the art to best utilize the invention.

In its broadest aspects, the invention is directed to a composite comprising at least one flexible substrate having a plurality of planar bodies affixed to a surface thereof and to articles fabricated therefrom. In the preferred embodiments of the invention, the composite, of this invention and articles fabricated therefrom exhibit improved penetration resistance when said composite and/or article is impacted by a projectile as a weapon such as a knife, icepick, shrapnel, flechette, flying glass or the like without adversely affecting the flexibility of the composite or article to an undue extent.

As used herein, the "penetration resistance" of the composite or article is the resistance to penetration by a designated threat, as for example, a bullet, an ice pick, a knife or the like. The penetration resistance can be expressed as the ratio of peak force (F) for designated threat (projectile, velocity, and other threat parameters known to those of skill in the art to affect peak force) divided by the areal density (ADT) of the target. As used herein, the "peak force" is the maximum force exerted by a threat to penetrate a designated target using a model 1331 high speed Instron Tester having an impact velocity of about 12 ft/sec (3.66 m/sec) and where the target strike face area has a diameter of 3 in. (7.6 cm) and as used herein, the "areal density" or "ADT" is the ratio of total target weight to the area of the target.

Figure 1:
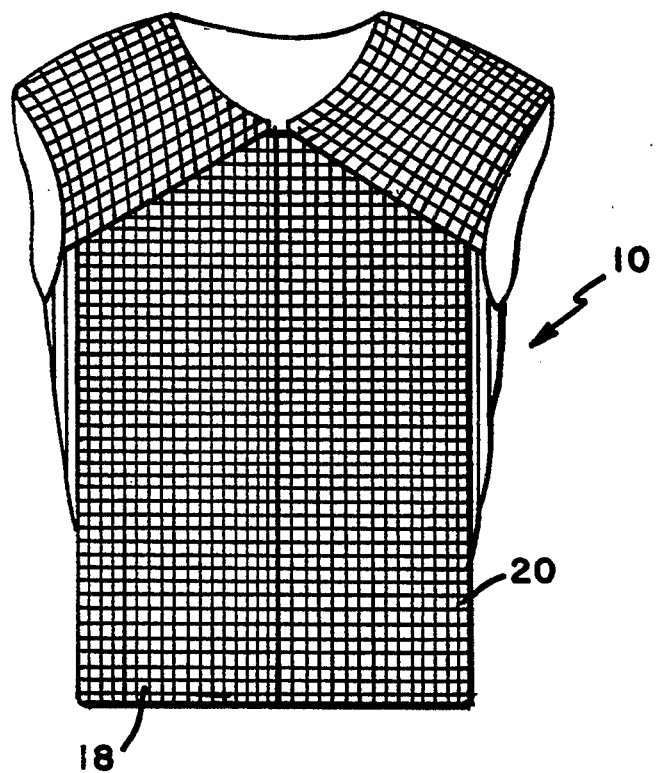
FIG. 1 is a depiction of Drape Test 1 for evaluation of the flexibility of a composite of this invention.

In general, the flexibility of the composite of the present invention can be demonstrated by Drape Test 1. In this test, a 30 cm square sample of the composite is placed onto a flat surface horizontally along one side edge with an overhang of 20 cm as shown in FIG. 1 and the amount of drape of the composite (the amount of drape being measured by the distance between the level of the clamped side edge and the opposite edge) is measured. The initial test is carried out with composite panel sides parallel to the edge and designated 0 degrees. The ratio of drop of the unsupported side, h or drape, to the distance of overhang, 1, is taken as a measure of the flexibility. The panel is rotated through various angles, and the flexibility measured in a similar manner. (The relationship of panel orientation to angle designation is shown in FIG. 1.) For flexible composite of this invention, the amount of drape in Drape Test 1 is ordinarily at least about 8 cm, preferably at least about 10 cm, more preferably at least about 13 cm and most preferably at least about 17 cm.

Figure 2:
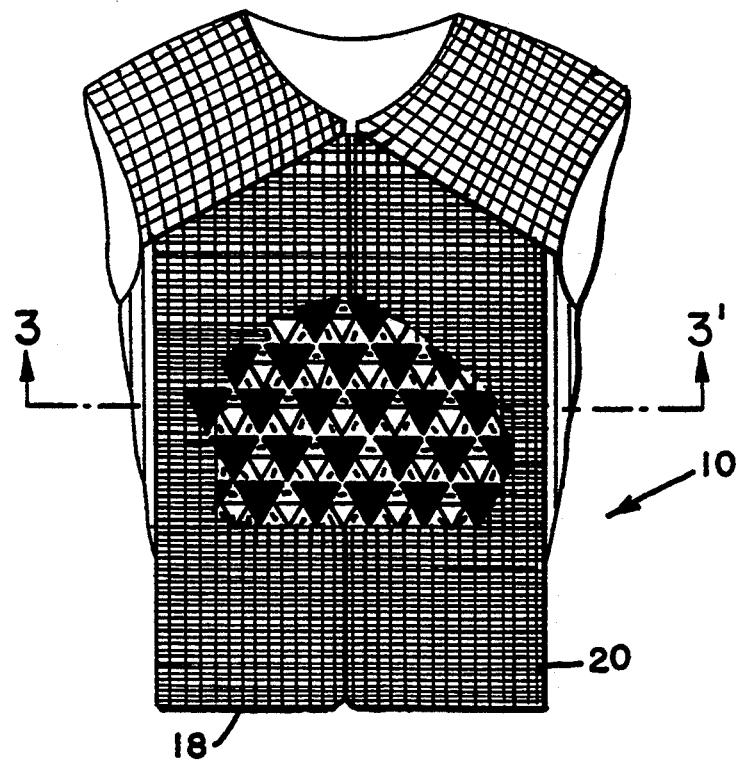
FIG. 2 is a depiction of Drape Test 2 for evaluation of the flexibility of the composite of this invention.

In the preferred embodiments of the invention the composite is flexible according to Drape Test 2. In this test, a square sample of the composite is draped around a cylinder (OD=4 inches (10.2 cm) and affixed with rubber bands as shown in FIG. 2. The ratio of the drop to the overhang was taken as a measure of flexibility. (See FIG. 2). This test is used to supplement Drape Test 1 in the preferred embodiments of the invention because it was noted that flexibility after flexing in one plane varied markedly with different panels.

Figure 3:
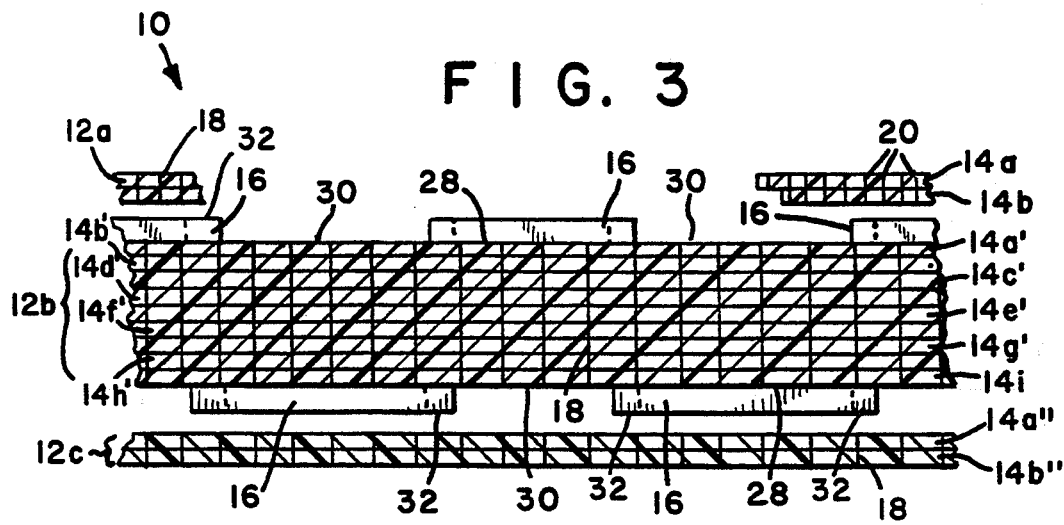
FIG. 3 is a front perspective view of a preferred embodiment of the article of this invention.
Figure 4:
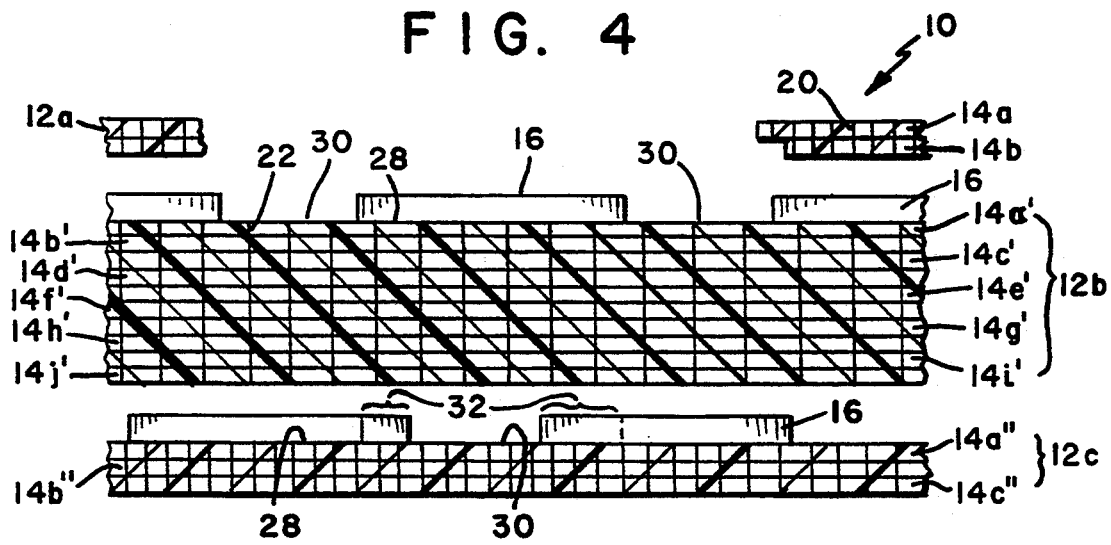
FIG. 4 is a front perspective view of the embodiment of FIG. 3 having certain selected components cut away for purpose of illustration.
Figure 5:
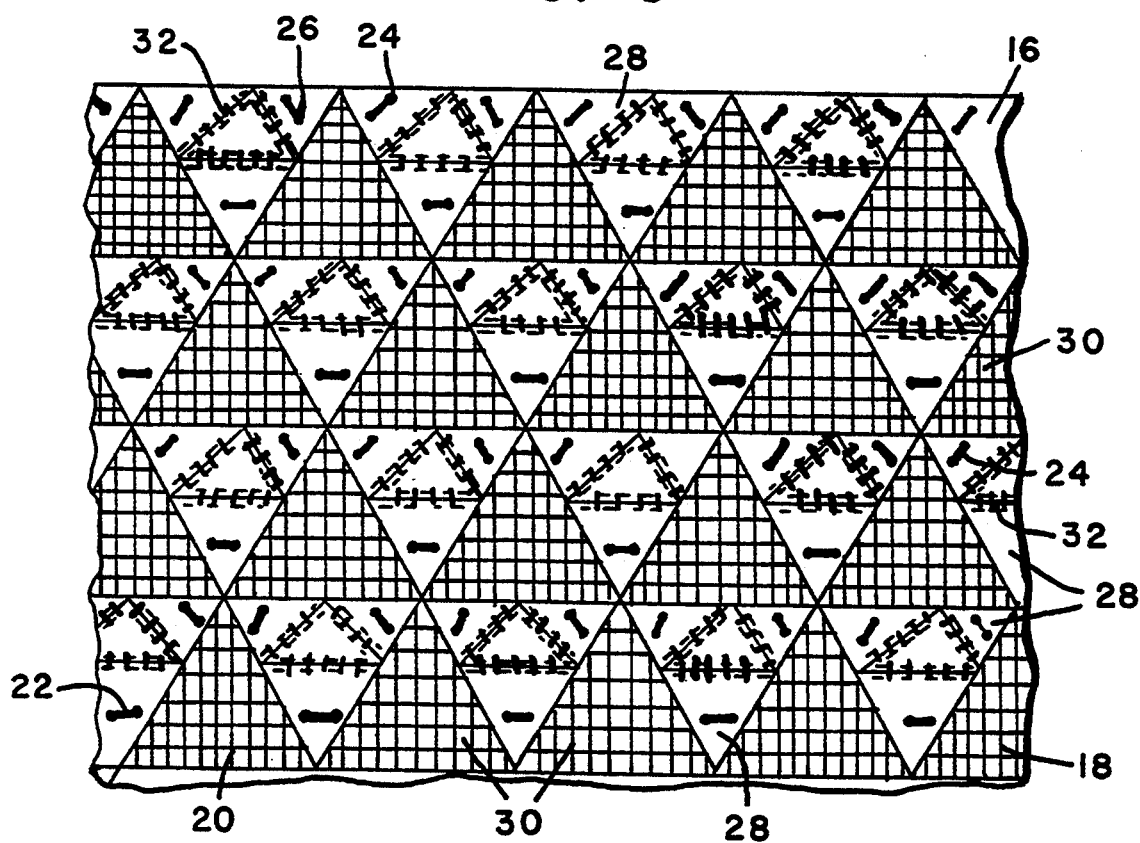
FIG. 5 is an enlarged fragmentary sectional view of the body armor of this invention of FIG. 4 taken on line 4—4'.

Referring to FIGS. 3 and 4, the numeral 10 indicates a penetration resistant article 10, which in the preferred embodiments of the invention is penetration resistant body armor. As depicted in the embodiment of FIG. 5, article 10 is comprised of one or more penetration resistant composite layers 12(a) and 12(b), cover layer 14 and backing layer 16. The number of composite layers 12 included in article 10 of this invention may vary widely depending on the use of the composite, for example, for those uses where article 10 would be used as penetration protection, the number of composite layers 12 would depend on a number of factors including the degree of penetration protection desired and other factors known to those of skill in the penetration protection art. In general for this application, the greater the degree of penetration protection desired the greater the number of composite layers 12 included in article 10 for a given weight of the article. Conversely, the lesser the degree of penetration protection required, the lesser the number of composite layer 12 required for a given weight of article 10. As depicted in FIG. 5, article 10 is comprised of two penetration resistant composite layers 12a to 12b. However, the number of composite layers 12 included in article 10 may vary widely, provided that at least one layer 15 is present. In general, the number of composite layers 12 in any embodiment will vary depending on the degree of penetration resistance and flexibility desired. The number of composite layers 12 is preferably from 1 to about 10, more preferably from about 1 to about 5 and most preferably from about 1 to about 2.

Figure 6:
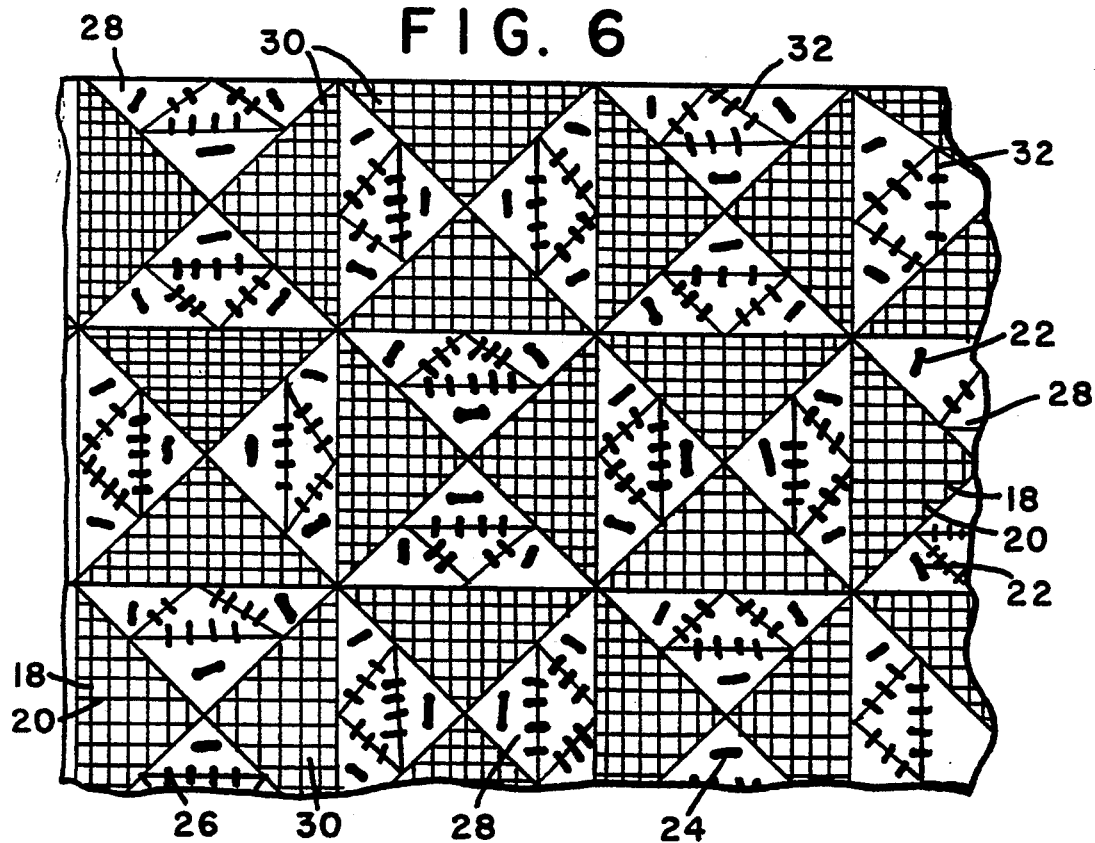
FIG. 6 is an enlarged fragmental sectional view of another body armor of this invention of the type depicted in FIG. 4 taken on line 4—4' showing detached elements of base layer.
Figure 7:
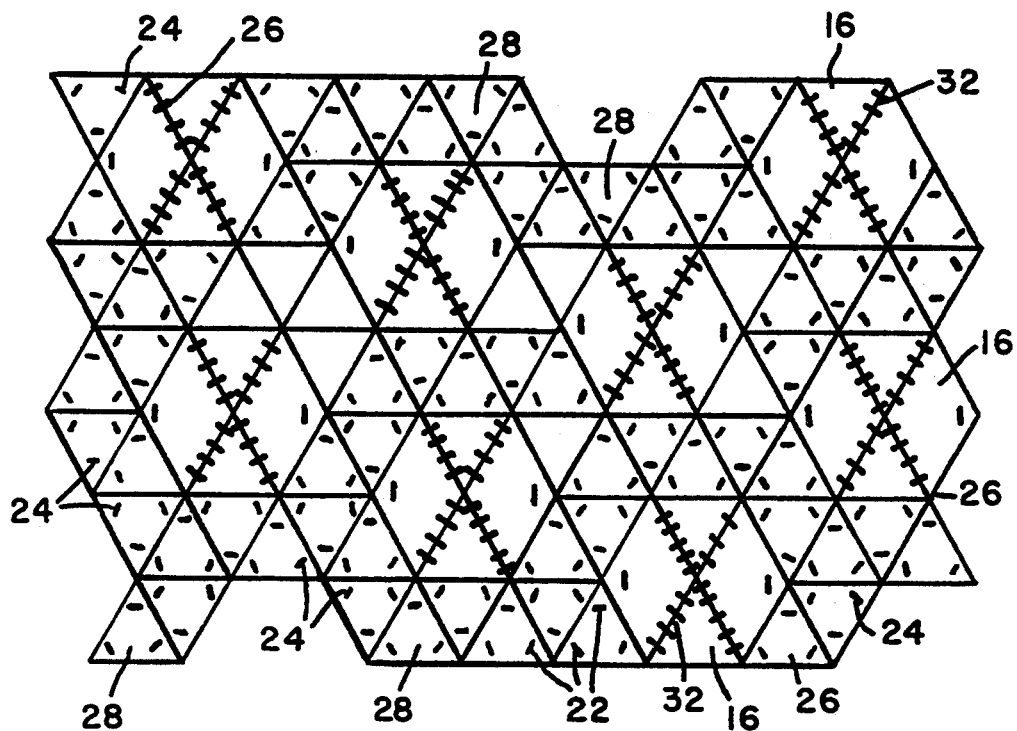
FIG. 7 is an enlarged fragmental sectional view of another body armor of this invention of the type depicted in FIG. 4 taken on line 4—4' showing detached elements of base layer.

As depicted in FIGS. 5, 6 and 7 in vertical cross-section, article 10 is comprised of cover layer 14, penetration resistant composite layers 12(a) and 12(b) and backing layer 16. As depicted in the FIGS. 5 and 6, penetration resistant composite layers 12(a) and 12(b) comprise a base layer 18 having filled regions 20 and unfilled regions 22, and surface planar bodies 24 which cover unfilled regions 22. Base layer 18 is formed by sandwiching planar bodies 26 between flexible layers 28 and 30. The position of sandwiched planar bodies 26 is substantially fixed. The manner in which bodies 26 are fixed may vary widely. For example, bodies 26 may be fixed by fixation to one or both of flexible layers 28 and 30. Any fixation means can be employed. For example, bodies 26 may be secured by bolts, rivets, adhesives, staples, stitches and the like. Bodies 26 may be affixed by direct attachment. For example, bodies 26 may be attached directly to one or more surfaces of flexible layers 28 and 30 by some suitable method as for example by directly bolting, gluing or sewing same to layer 28 and/or 30 at one or more points of attachment. Bodies 26 may also be fixed indirectly by isolation in a pocket formed from layers 28 and 30. For example, bodies 26 may be fixed within a pocket by tieing layers 28 and 30 together about all or a portion of the outer circumference of bodies 26 by some suitable means as for example, stitches, adhesives, bolts and the like to form filled regions 20. The relative positions and fixations of bodies 26 between layers 28 and 30 is such that filled regions 20 and unfilled regions 22 are formed. Penetration resistant composite layer 12 is formed by fixation of surface planar bodies 24 to one or more surfaces of base panel 18 preferably such that at least about 85 area %, preferably at least about 90 area %, more preferably at least about 95 area % and most preferably at least about 100 area % of unfilled regions 22 of resistant layer 12 are covered by surface planar bodies 24.

Surface planar bodies 24 may be affixed or secured to one or another surface of base layer 18 by any conventional means. Means for attaching planar bodies 24 to a surface of base layer 18 may vary widely and may include any means normally used in the art to provide this function. Illustrative of useful attaching means are adhesives such as those discussed in R. C. Liable, Ballistic Materials and Penetration Mechanics, Elsevier Scientific Publishing Co. (1980). Illustrative of other useful attaching means are bolts, screws, staples mechanical interlocks, stitching, or a combination of any of these conventional methods. As depicted in FIGS. 2 and 6 to 14 in the preferred embodiments of the invention planar bodies 24 are stitched to the surface of base layer 18 by way of stitches or optionally, the stitching may be supplemented by an adhesive.

As shown in FIGS. 5, 6 and 7, unfilled regions 22 are formed by securing flexible layers 28 and 30 together forming a layered region 22 comprised of two or more layers. Any conventional securing means may be used including but not limited to bolts, rivets, adhesive, staples, stitches, and the like. In the preferred embodiments of the invention securing means is adhesive, lamination in those instances when layers 28 and 30 are formed of a laminatable material, stitches or a combination thereof.

In the preferred embodiments of the invention depicted in FIGS. 3 and 4, where layers 28 and 30 are fibrous, horizontal stitches and vertical stitches (not depicted) are utilized to secure substrate layers 28 and 30. The type of stitching employed may vary widely. Stitching and sewing methods such as lock stitching, chain stitching, zig-zag stitching and the like are illustrative of the type of stitching for use in this invention. The nature of the stitching fiber will vary widely and any type of fiber may be used. Useful stitching threads and fibers may vary widely and will be described in more detail herein below in the discussion of fiber for use in the fabrication of layers 28 to 30. In those embodiments of the invention where layers 28 and 30 are not relied on for penetration resistance the tensile modulus and tenacity of the fiber may vary from very low to very high. However, in those embodiments of the invention where layers 28 to 30 contribute to the penetration resistance of article 10 fibers having a relatively high tensile modulus and tenacity are employed. In these embodiments, it has been found that a relatively high modulus (equal to or greater than about 200 grams/denier) and a relatively high tenacity (equal to or greater than about 5 grams/denier) fiber is advantageous when layers 28 and 30 contribute to the pentration resistance of article 10. All tensile properties are evaluated by pulling a 10 in (25.4 cm) fiber length clamped in barrel clamps at a rate of 10 in/min (25.4 cm/min) on an Instron Tensile Tester. In the preferred embodiments of the invention, the tensile modulus is from about 400 to about 3000 grams/denier and the tenacity is from about 20 to about 50 grams/denier, more preferably the tensile modulus is from about 1000 to about 3000 grams/denier and the tenacity is from about 25 to about 50 grams/denier and most preferably the tensile modulus is from about 1500 to about 3000 grams/denier and the tenacity is from about 30 to about 50 grams/denier. However, the thread or fiber used in stitching means is preferably an aramid fiber or thread (as for example Kevlar ® 29, 49, 129 and 149 aramid fibers), an extended chain polyethylene thread or fiber (as for example Spectra ® 900 and Spectra ® 1000 polyethylene fibers) or a mixture thereof.

Layers 30 and 28 may vary widely, the only requirement is that they be flexible as defined above. For example, layers 28 and 30 may be a flexible polymer or elastomeric film formed from a thermoplastic or elastomeric resin. Such thermoplastic and elastomeric resins for use in the practice of this invention may vary widely. Illustrative of useful thermoplastic resins are polylactones such as poly(pivalolactone), poly($\epsilon$-caprolactone) and the like; polyurethanes derived from reaction of diisocyanates such as 1,5-naphalene diisocyanate, p-phenylene diisocyanate, m-phenylene diisocyanate, 2,4-toluene diisocyanate, 4',4'-diphenylmethane diisocyanate, 3,3'-dimethyl-4,4'-diphenylisopropylidiene diisocyanate, 3,3'-dimethyl-4,4'-diphenyl diisocyanate, 3,3'-dimethyl-4,4'-dephenylmethane diisocyanate, 3,3'-dimethyoxy-4,4'-biphenyl diisocyanate, dianisidine diisocyanate, tolidine diisocyanate, hexamethylene diisocyanate, 4,4-diisocyananodiphenylmethane and the like and linear long-chain diols such as poly(tetramethylene adipate), poly(ethylene adipate), poly(1,4-butylene adipate), poly(ethylene adipate), polyether diols and the like; polycarbonates such as poly[1,1-ether bis(4-phenyl carbonate)], poly[1,1-ether bis(4-phenyl) carbonate], poly[diphenylmethane bis (4-phenyl) carbonate], poly[1,1-cyclohexane bis (4-phenyl) carbonate], poly[1,1-cyclohexane bis(4-phenyl carbonate] and the like; poly sulfones; polyether ether ketones; polymides such as poly(4-amino butyric acid), poly(hexamethylene adipamide), poly(6-aminohexanoic aicd), poly(m-xylylene adipamide), poly(p-xylylene sebacamide), poly 2,2,2-trimethyl hexamethylene terephthalamide), poly(metaphenyleneisophthalamide)(Nomex ®), poly(p-phenylene terephthalamide) (Kevlar ®), and the like; polyesters such as poly(ethylene azelate), poly(ethylene-1,5-naphthalate), poly(ethylene oxybenzoate) (A-Tell), poly(ethylene oxybenzoate) (A-Tell), poly(parahydroxy benzoate) (Ekonol), poly(1,4-cyclohexylidene dimethylene terephthalate) (Kodel)(as), poly(1,4-cyclohexylidene dimethylene terephthalate) (Kodel)(- trans), polyethylene terephthalate terephthalate and the like; poly(arylene oxides) such as poly(2,6-diphenyl-1,4-phenylene oxide), poly(2,6-diphenyl-1,4-phenylene oxide) and the like; poly(arylene sulfides) such as poly(phenylene sulfide) and the like; polyetherimides; thermoplastic elastomers such as polyurethane elastomers, fluoroelastomers, butadiene/acrylonitrule elastomers, block copolymers, made up of segments of glassy or crystalline blocks such as polystyrene, poly(vinyl-toluene), poly(t-butyl styrene), polyester and the like and the elastomeric blocks such as polybutadiene, polyisoprene, ethylene-propylene copolymers, ethylene-butylene copolymers, polyether ester and the like as for example the copolymers in polystyrene-polybutadiene-polystrene block copolymer manufactured by Shell Chemical Company under the trade name of Kraton ®; vinyl polymer and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), poly(methylmethacrylate), polyethyl methacrylate, poly(n-butyl methacrylate), polyacrylamide, polyacrylonitrile, polyacrylic acid, ethyleneacrylic acid copolymers, methyl methacrylate-styrene copolymers, ethyleneethyl acrylate copolymers, methacrylated butadiene-styrene copolymers and the like; polyolefins such as low density polyethylene, polyolefins such as low density polyethylene, polypropylene, chlorinated low desity polyethlene, poly(4-methyl-1-pentene) and the like; ionomers; and polyepichlorohydrins; polycarbonates and the like.

Layers 28 and 30 may also comprise a network of fibers either alone or dispersed in a matrix. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

The cross-section of fibers for use in this invention may vary widely. Useful fibers may have a circular cross-section, oblong cross-section or irregular or regular multi-lobal cross-section having one or more regular or irregular lobes projecting from the linear or longitudinal axis of the fibers. In the particularly preferred embodiments of the invention, the fibers are of substantially circular or oblong cross-section and in the most preferred embodiments are of circular or substantially circular cross-section.

Layers 28 and 30 may be formed from fibers alone, or from fibers coated with a suitable polymer, as for example, a polyolefin, polyamide, polyester, polydiene such as a polybutadiene, urethanes, diene/olefin copolymers, poly(styrene-butadiene-styrene) block copolymers, and a wide variety of elastomers. Layers 22 and 24 may also comprise a network of a fibers dispersed in a polymeric matrix as for example a matrix of one or more of the above referenced polymers to form a flexible composite as described in more detail in U.S. Pat. Nos. 4,623,574; 4,748,064; 4,916,000; 4,403,012; 4,457,985; 4,650,710; 4,681,792; 4,737,401; 4,543,286; 4,563,392; and 4,501,856. Regardless of the construction, layers 28 and 30 are such that article 10 has the required degree of flexibility.

The fibers in layers 28 and 30 may be arranged in networks having various configurations. For example, a plurality of fibers can be grouped together to form twisted or untwisted yarn bundles in various alignments. The filaments or yarn may be formed as a felt, knitted or woven (plain, basket, satin and crow feet weaves, etc.) into a network, fabricated into non-woven fabric, arranged in parallel array, layered, or formed into a woven fabric by any of a variety of conventional techniques. Among these techniques, for ballistic resistance applications we prefer to use those variations commonly employed in the preparation of aramid fabrics for ballistic-resistant articles. For example, the techniques described in U.S. Pat. No. 4,181,768 and in M. R. Silyquist et al., *J. Macromol Sci. Chem.*, A7(1), pp. 203 et. seq. (1973) are particularly suitable.

The denier of the fiber may vary widely. In general, fiber denier is equal to or less than about 4000. In the preferred embodiments of the invention, fiber denier is from about 10 to about 4000, the more preferred embodiments of the invention fiber denier is from about 10 to about 1000 and in the most preferred embodiments of the invention, fiber denier is from about 10 to about 400.

The type of fibers used in the fabrication of layers 28 and 30 may vary widely, may be inorganic or organic fibers. Useful inorganic fibers include S-glass fibers, E-glass fibers, carbon fibers, boron fibers, alumina fibers, zirconia-silica fibers, alumina-silica fibers and the like.

Illustrative of useful organic fibers are those composed of polyesters, polyolefins, polyetheramides, fluoropolymers, polyethers, celluloses, phenolics, polyesteramides, polyurethanes, epoxies, aminoplastics, polysulfones, polyetherketones, polyetheretherketones, polyesterimides, polyphenylene sulfides, polyether acryl ketones, poly(amideimides), and polyimides. Illustrative of other useful organic filaments are those composed of aramids (aromatic polyamides), such as poly(m-xylylene adipamide), poly(p-xylylene sebacamide), poly 2,2,2-trimethyl-hexamethylene terephthalamide), poly(piperazine sebacamide), poly(metaphenylene isophthalamide) (Nomex ®) and poly(p-phenylene terephthalamide) (Kevlar ®); aliphatic and cycloaliphatic polyamides, such as the copolyamide of 30% hexamethylene diammonium isophthalate and 70% hexamethylene diammonium adipate, the copolyamide of up to 30% bis-(amidocyclohexyl)methylene, terephthalic acid and caprolactam, polyhexamethylene adipamide (nylon 66), poly(butyrolactam) (nylon 4), poly (9-aminonoanoic acid) (nylon 9), poly(enantholactam) (nylon 7), poly(capryllactam) (nylon 8), polycaprolactam (nylon 6), poly (p-phenylene terephthalamide), polyhexamethylene sebacamide (nylon 6,10), polyaminoundecanamide (nylon 11), polydodeconolactam (nylon 12), polyhexamethylene isophthalamide, polyhexamethylene terephthalamide, polycaproamide, poly(nonamethylene azelamide) (nylon 9,9), poly(decamethylene azelamide) (nylon 10,9), poly(decamethylene sebacamide) (nylon 10,10), poly[bis-(4-aminocyclothexyl) methane 1,10-decanedicarboxamide](Qiana) (trans), or combination thereof; and aliphatic, cycloaliphatic and aromatic polyesters such as poly(1,4-cyclohexlidene dimethyleneterephathalate) cis and trans, poly(ethylene-1, 5-naphthalate), poly(ethylene-2,6-naphthalate), poly(1, 4-cyclohexane dimethylene terephthalate) (trans), poly(decamethylene terephthalate), poly(ethylene terephthalate), poly(ethylene isophthalate), poly(ethylene oxybenozoate), poly(parahydroxy benzoate), poly(dimethylpropiolactone), poly(decamethylene adipate), poly(ethylene succinate), poly(ethylene azelate), poly(decamethylene sebacate), poly(dimethylpropiolactone), and the like. Also illustrative of useful organic fibers are those of liquid crystalline polymers such as lyotropic liquid crystalline polymers which include polypeptides such as poly-α-benzyl L-glutamate and the like; aromatic polyamides such as poly(1,4-benzamide), poly(chloro-1,4-phenylene terephthalamide), poly(1,4-phenylene fumaramide), poly(chloro-1,4-phenylene fumaramide), poly(4,4'-benzanilide trans, transmuconamide), poly(1,4-phenylene mesaconamide), poly(1,4-phenylene) (trans-1,4-cyclohexylene amide), poly(chloro-1,4-phenylene) (trans-1,4-cyclohexylene amide), poly(1,4-phenylene 1,4-dimethyl-trans-1,4-cyclohexylene amide), poly(1,4-phenylene 2,5-pyridine amide), poly(chloro-1,4-phenylene 2,5-pyridine amide), poly(3,3'-dimethyl-4,4'-biphenylene 2,5-pyridine amide), poly(1,4-phenylene 4,4'-stilbene amide), poly(chloro-1,4-phenylene 4,4'-stilbene amide), poly(1,4-phenylene 4,4'-azobenzene amide), poly(4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3,8-phenanthridinone terephthal amide), poly (4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly(3,3'-dimethyl-4,4-biphenylene terephthal amide), poly(3,3'-dimethoxy-4,4'-biphenylene terephthal amide), poly(3,3'-dimethoxy-4, 4-biphenylene 4,4'-bibenzo amide) and the like; polyoxamides such as those derived from 2,2'-dimethyl-4,4'diamino biphenyl and chloro-1,4-phenylene diamine; polyhydrazides such as poly chloroterephthalic hydrazide, 2,5-pyridine dicarboxylic acid hydrazide) poly(terephthalic hydrazide), poly(terephthalic-chloroterephthalic hydrazide) and the like; poly(amide-hydrazides) such as poly(terephthaloyl 1,4-amino-benzhydrazide) and those prepared from 4-amino-benzhydrazide, oxalic dihydrazide, terephthalic dihydrazide and para-aromatic diacid chlorides; polyesters such as those of the compositions include poly(oxy-trans-1, 4-cyclohexyleneoxycarbonyl-trans-1,4-cyclohexylenecarbonyl-β-oxy-1,4-phenyl-eneoxyterephthaloyl) and poly(oxy-cis-1,4-cyclohexyleneoxycarbonyl-trans-1,4-cyclohexylenecarbonyl-β-oxy-1,4-phenyleneoxyterephthaloyl) in methylene chloride-o-cresol poly[(oxy-trans-1,4-cyclohexylene-oxycarbonyl-trans-1, 4-cyclohexylenecarbonyl-β-oxy-(2-methyl-1,4-phenylene) oxy-terephthaloyl)] in 1,1,2,2-tetrachloroethane-o-chlorophenol-phenol (60:25:15 vol/vol/vol), poly[oxy- trans-1,4-cyclohexyleneoxycarbonyl-trans-1,4-cyclohexylenecarbonyl-β-oxy(2-methyl-1,3-phenylene)oxyterephthaloyl] in o-chlorophenol and the like; polyazomethines such as those prepared from 4,4'-diaminobenzanilide and terephthaldehyde, methyl-1,4-phenylenediamine and terephthalaldelyde and the like; polyisocyanides such as poly(-phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyotropic crystalline polymers with heterocylic units such as poly(1,4-phenylene-2,6-benzobisthiazole)(PBT), poly(1,4- phenylene-2,6-benzobisoxazole) (PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phneylene)-4-phenylquinoline], poly[1,1'-(4,4'-biphenylene)-6,6'-bis(4-phenylquinoline)] and the like; polyorganophosphazines such as polyphosphazine, polybisphenoxyphosphazine, poly[bis(2,2,2'-trifluoroethyelene) phosphazine] and the like; metal polymers such as those derived by condensation of trans-bis(tri-n-butylphosphine) platinum dichloride with a bisacetylene or trans-bis(tri-n-butylphosphine)-bis(1,4-butadienyl)platinum and similar combinations in the presence of cuprous iodine and an amide; cellulose and cellulose derivatives such as esters of cellulose as for example triacetate cellulose, acetate cellulose, acetate-butyrate cellulose, nitrate cellulose, and sulfate cellulose, ethers of cellulose as for example, ethyl ether cellulose, hydroxymethyl ether cellulose, hydroxypropyl ether cellulose, carboxymethyl ether cellulose, ethyl hydroxyethyl ether cellulose, cyanoethylethyl ether cellulose, ether-esters of cellulose as for example acetoxyethyl ether cellulose and benzoyloxypropyl ether cellulose, and urethane cellulose as for example phenyl urethane cellulose; thermotropic liquid crystalline polymers such as celluloses and their derivatives as for example hydroxypropyl cellulose, ethyl cellulose propionoxypropyl cellulose, thermotropic liquid crystalline polymers such as celluloses and their derivatives as for example hydroxypropyl cellulose, ethyl cellulose propionoxypropyl cellulose; thermotropic copolyesters as for example copolymers of 6-hydroxy-2-naphthoic acid and p-hydroxy benzoic acid, copolymers of 6-hydroxy-2-naphthoic acid, terephthalic acid and p-amino phenol, copolymers of 6-hydroxy-2-naphthoic acid, terephthalic acid and hydroquinone, copolymers of 6-hydroxy-2-naphthoic acid, p-hydroxy benzoic acid, hydroquinone and terephthalic acid, copolymers of 2,6-naphthalene dicarboxylic acid, terephthalic acid, isophthalic acid and hydroquinone, copolymers of 2,6-naphthalene dicarboxylic acid and terephthalic acid, copolymers of p-hydroxybenzoic acid, terephthalic acid and 4,4'-dihydroxydiphenyl, copolymers of p-hydroxybenzoic acid, terephthalic acid, isophthalic acid and 4,4'-dihydroxydiphenyl, p-hydroxybenzoic acid, isophthalic acid, hydroquinone and 4,4'-dihydroxybenzophenone, copolymers of phenylterephthalic acid and hydroquinone, copolymers of chlorohydroquinone, terephthalic acid and p-acetoxy cinnamic acid, copolymers of chlorohydroquinone, terephthalic acid and ethylene dioxy-4,4'-dibenzoic acid, copolymers of hydroquinone, methylhydroquinone, p-hydroxybenzoic acid and isophthalic acid, copolymers of (1-phenylethyl)hydroquinone, terephthalic acid and hydroquinone, and copolymers of poly(ethylene terephthalate) and p-hydroxybenzoic acid; and thermotropic polyamides and thermotropic copoly(amide-esters).

Also illustrative of useful organic filaments for use in the fabrication of substrate layer 14 are those composed of extended chain polymers formed by polymerization of α, β-unsaturated monomers of the formula:

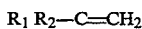

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α, β-unsaturated monomers are polymers including polystyrene, polyethylene, polypropylene, poly(1-octadecene), polyisobutylene, poly(1-pentene), poly(2-methylstyrene), poly(4-methylstyrene), poly(1-hexene), poly(1-pentene), poly(4-methoxystrene), poly(5-methyl-1-hexene), poly(4-methylpentene), poly (1-butene), polyvinyl chloride, polybutylene, polyacrylonitrile, poly(methyl pentene-1), poly(vinyl alcohol), poly(vinyl-acetate), poly(vinyl butyral), poly(vinyl chloride), poly(vinylidene chloride), vinyl chloride-vinyl acetate chloride copolymer, poly(vinylidene fluoride), poly(methyl acrylate, poly(methyl methacrylate), poly(methacrylo-nitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentene), poly(1-hexane), poly(5-methyl-1-hexene), poly(vinyl-cyclopentane), poly(vinylcyclothexane), poly(a-vinyl-naphthalene), poly(vinyl methyl ether), poly(vinyl-ethylether), poly(vinyl propylether), poly(vinyl carbazole), poly(vinyl pyrolidone), poly(2-chlorostyrene), poly(4-chlorostyrene), poly(vinyl formate), poly(vinyl butyl ether), poly(vinyl octyl ether), poly(vinyl methyl ketone), poly(methyl-isopropenyl ketone), poly(4-phenylstyrene) and the like.

In general, the particular material employed in any particular situation will depend to a large extent on the extent to which layers 28 and 30 contributed to the penetration resistance of the article. For example, in those embodiments where layers 28 and 30 do not contribute to the penetration resistance to any significant extent and are used primarily to position planar bodies 26 and 24, generally any kind of material can be used. On the other hand where layers 28 and 30 are intended to contribute to the penetration resistance of the article, penetration resistant materials are used. In those embodiments of the invention where layers 28 and 30 are penetration resistant, layers 28 and 30 are preferrably a fibrous network such as a woven or non-woven fabric or a fibrous net work in a polymeric matrix. Preferred fibers for use in the practice of this invention are those having a tenacity equal to or greater than about 10 grams/denier (g/d) (as measured by an Instron Tensile Testing machine), a tensile modulus equal to or greater than about 150 g/d (as measured by an Instron Tensile Testing machine) and an energy-to-break equal to or greater than about 8 joules/gram. Particularly preferred fibers are those having a tenacity equal to or greater than about 20 g/d, a tensile modulus equal to or greater than about 500 g/d and energy-to-break equal to or greater than about 30 joules/grams. Amongst these particularly preferred embodiments, most preferred are those embodiments in which the tenacity of the fibers is equal to or greater than about 25 g/d, the tensile modulus is equal to or greater than about 1000 g/d, and the energy-to-break is equal to or greater than about 35 joules/gram. In the practice of this invention, filaments of choice have a tenacity equal to or greater than about 30 g/d, the tensile modulus is equal to or greater than about 1300 g/d and the energy-to-break is equal to or greater than about 40 joules/gram.

In the most preferred embodiments of the invention, article 10 includes sandwiching layers 28 and 30, which may include polyethylene fibers, polypropylene fibers, nylon fibers, polyester fibers, liquid crystal copolyester fibers, aramid fibers, polyvinyl alcohol fibers, polyacrylonitrile fibers or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of molecular weight of at least 150,000, preferably at least one million and more preferably between two million and five million. Such extended chain polyethylene (ECPE) fibers may be grown in solution as described in U.S. Pat. No. 4,137,394 or U.S. Pat. No. 4,356,138 or fibers spun from a solution to form a gel structure, as described in German Off. 3,004,699 and GB 2051667, and especially described in U.S. Pat. No. 4,457,985 (see EPA 64,167, published Nov. 10, 1982). As used herein, the term polyethylene shall mean a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least 15 grams/denier (as measured by an Instron Testing Machine), preferably at least 20 grams/denier, more preferably at least 25 grams/denier and most preferably at least 30 grams/denier. Similarly, the tensile modulus of the fibers, as measured by an Instron Tensile Testing Machine, is at least 300 grams/denier, preferably at least 500 grams/denier and more preferably at least 1,000 grams/denier and most preferably at least 1,200 grams/denier. These highest values for tensile modulus and tenacity are generally obtainable only by employing solution grown or gel fibers processes.

Similarly, highly oriented polypropylene fibers of molecular weight at least 200,000, preferably at least one million and more preferably at least two million may be used. Such high molecular weight polypropylene may be formed into reasonably well oriented fibers by the techniques prescribed in the various references referred to above, and especially by the technique of U.S. Pat. No. 4,551,296 and commonly assigned. Since polypropylene is a much less crystalline material than polyethylene and contains pendant methyl groups, tenacity values achievable with polypropylene are generally substantially lower than the corresponding values for polyethylene. Accordingly, a suitable tenacity is at least 8 grams/denier (as measured by an Instron Tensile Testing Machine), with a preferred tenacity being at least 11 grams/denier. The tensile modulus for polypropylene is at least 160 grams/denier, preferably at least 200 grams/denier. The particularly preferred ranges for the above-described parameters can advantageously provide improved performance in the final article.

High molecular weight polyvinyl alcohol fibers having high tensile modulus are described in U.S. Pat. No. 4,440,711, which is hereby incorporated by reference to the extent it is not inconsistent herewith. In the case of polyvinyl alcohol (PV-OH), PV-OH fiber of molecular weight of at least about 200,000. Particularly useful PV-OH fiber should have a tensile modulus of at least about 300 g/d (as measured by an Instron Tensile Testing Machine), a tenacity of at least 7 g/d (preferably at least about 10 g/d, more preferably at about 14 g/d, and most preferably at least about 17 g/d), and an energy-to-break of at least about 8 joules/gram. PV-OH fibers having a weight average molecular weight of at least about 200,000, a tenacity of at least about 10 g/d, a tensile modulus of at least about 300 g/d, and an energy-to-break of about 8 joules/gram are more useful in producing a ballistic resistant article. PV-OH fiber having such properties can be produced, for example, by the process disclosed in U.S. Pat. No. 4,599,267.

In the case of polyacrylonitrile (PAN), PAN fibers of molecular weight of at least about 400,000. Particularly useful PAN fibers should have a tenacity of at least about 10 g/d and an energy-to-break of at least about 8 joules/gram. PAN fibers having a molecular weight of at least about 400,000, a tenacity of at least about 15 to about 20 g/d and an energy-to-break of at least 8 joules/gram is most useful in producing ballistic resistant articles; and such fibers are disclosed, for example, in U.S. Pat. No. 4,535,027.

In the case of aramid fibers, suitable aramid fibers formed principally from aromatic polyamide are described in U.S. Pat. No. 3,671,542, which is hereby incorporated by reference. Preferred aramid fiber will have a tenacity of at least about 20 g/d (as measured by an Instron Tensile Testing Machine), a tensile modulus of at least about 400 g/d (as measured by an Instron Tensile Testing Machine) and an energy-to-break at least about 8 joules/gram, and particularly preferred aramid fiber will have a tenacity of at least about 20 g/d, a modulus of at least about 480 g/d and an energy-to-break of at least about 20 joules/gram. Most preferred aramid fibers will have a tenacity of at least about 20 g/denier, a modulus of at least about 900 g/denier and an energy-to-break of at least about 30 joules/gram. For example, poly(phenylene terephthalamide) fibers produced commercially by Dupont Corporation under the trade name of Kevlar ® 29, 49, 129 and 149 having moderately high moduli and tenacity values are particularly useful in forming ballistic resistant composites. Also useful in the practice of this invention is poly(metaphenylene isophthalamide) fibers produced commercially by Dupont under the tradename Nomex ®.

In the case of liquid crystal copolyesters, suitable fibers are disclosed, for example, in U.S. Pat. Nos. 3,975,487; 4,118,372; and 4,161,470, hereby incorporated by reference. Tenacities of about 15 to about 30 g/d (as measured by an Instron Tensile Testing Machine) and preferably about 20 to about 25 g/d, and tensile modulus of about 500 to 1500 g/d (as measured by an Instron Tensile Testing Machine) and preferably about 1000 to about 1200 g/d are particularly desirable.

In the case of nylon fibers, suitable fibers include those formed from nylon 6, nylon 6,6, nylon 6, 10 and the like. Suitable polyester fibers include poly(ethylene terephthalate).

Figure 8:
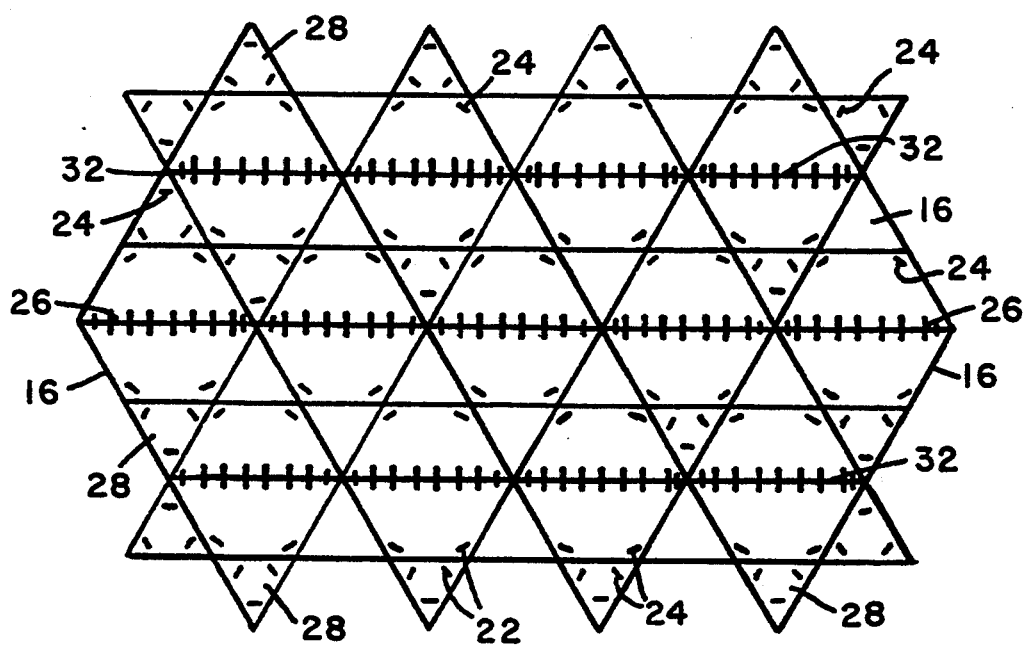
FIG. 8 is an enlarged fragmental sectional view of another body armor of this invention of the type depicted in FIG. 4 taken on line 4—4' showing detached elements of base layer 18 showing the arrangement of hexagonal planar bodies 26 between layers 28 and 30, the arrangement of triangular surface bodies 24 on the bottom surface of cover layer 14 and the arrangement of triangular suface bodies 24 on the top surface of backing layer 16.
Figure 9:
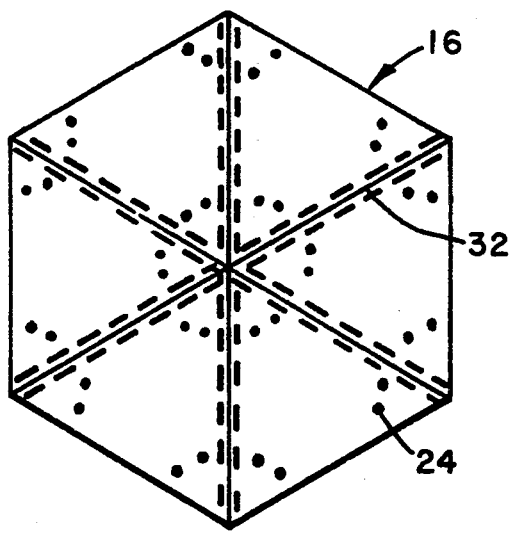
FIG. 9 is an enlarged sectional view of another body armor similar to that of FIG. 4 taken along line 4—4' showing the attachment of planar bodies 24 to unfilled regions 22 by way of spacers 22(a).

As shown in the Figures, the position of planar bodies 24 and the manner in which they are positioned such that each planar body is isolated from each other planar body can vary widely and planar bodies 24 and 26 are positioned such that the desired degree of coverage of the area to be protected is provided. Preferably 100% area coverage or substantially 100% area coverage is provided. More preferably, as depicted in FIGS. 8 and 9, planar bodies 24 and 26 are positioned such that they overlap by some portion 32(a). For example, as depicted in FIGS. 5, 6, 7, 8 and 9 base layer 18 includes a plurality of planar bodies 30 affixed to one or more surfaces of base layer 18 in total or partial alignment with unfilled region 22. As depicted in FIG. 6, planar bodies 24 may be affixed to the same side of base layer 18 or as depicted in FIG. 7, planar bodies 24 may be affixed to different sides of base layer 18. Alternatively, as shown in FIG. 9, planar bodies 24 may be attached to different sides of base layer 18 to unfilled region 22 by way of spacers 22(a) which allow overlap of planar bodies 24 and filled region 20. In yet another variation as shown in FIG. 8, planar bodies 24 may be affixed to cover layer 14 and/or to backing layer 16 in alignment with unfilled regions 22.

The use of planar bodies 24 and 26 enhances the penetration resistance of article 10. As a penetrating threat such as a bullet, knife, ice pick, flechette or the like, impacts a planar body 24 or 26, the threat can be broken, bent, enlarged and/or flattened to increase its impact area and decrease the velocity of the threat.

Means for attaching planar bodies 24 to base panel 18 may vary widely and may include any means normally used in the art to provide this function. Illustrative of useful attaching means are adhesives such as those discussed in R. C. Liable, *Ballistic Materials and Penetration Mechanics*, Elsevier Scientific Publishing Co. (1980). Illustrative of other useful attaching means are bolts, screws, staples mechanical interlocks, stitching, or a combination of any of these conventional methods. In the preferred embodiments of the invention, planar bodies 24 are stitched to the surface of base layer 18 by way of stitches (not depicted). Optionally, the stitching may be supplemented by or replaced adhesive. As shown in FIGS. 5, 6, 7, 8 and 9 the plurality of planar bodies 24 are positioned on the surfaces of base layer 18 such that unfilled areas 28 are totally or partially covered by a planar bodies 24 affixed to one or both surfaces of area 22. As shown in FIGS. 5, 6, 7, 8 and 9 the plurality of planar bodies 24 are positioned such that the, planar bodies 24 are in alignment with unfilled regions 22. In the preferred emodiments of the invention depicted in FIGS. 8 and 9, each planar body 24 is uniformly larger than its corresponding unfilled region 22 such that planar bodies 24 adjacent to an unfilled region 22 partially overlap with the adjacent filled regions 20 by some portion 32. The degree of overlap may vary widely, but in general is such that preferably more than about 90 area %, more preferably more than about 95 area % and most preferably more than about 100 area % of unfilled regions 22 covered by its corresponding planar body 24.

Figure 11:
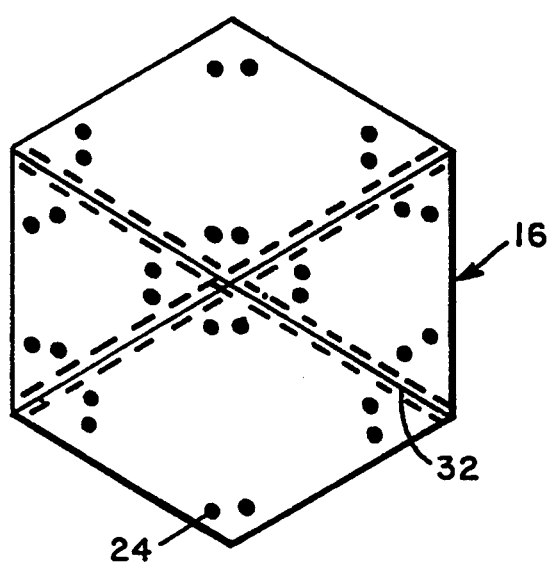
FIG. 11 is an enlarged fragmentary sectional view of a body armor of this invention similar to that of FIG. 4 taken along line 4—4' which comprises at least two base layers 18(a) and 18(b) in which layers 18(a) and 18(b) are aligned such that filled regions of layer 18(a) are aligned with unfilled regions 22 of adjacent layer 18(b) and the unfilled regions of layer 18 (a) are aligned with the filled regions of adjacent layer 18(b).
Figure 12:
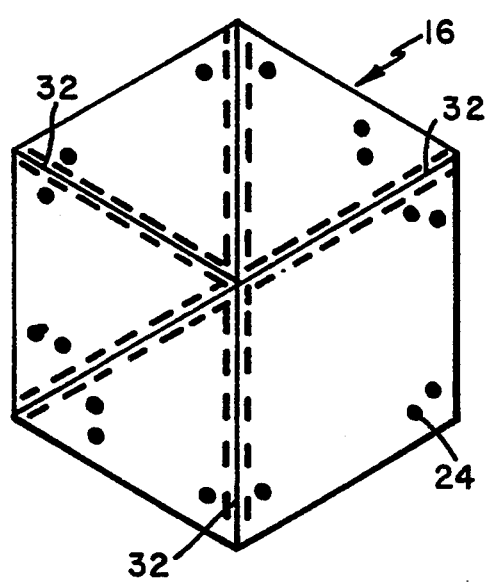
FIG. 12 is a fragmentary overview of the arrangement of FIG. 4 in alignment as positioned in article 10 showing the extent of coverage by the combination of hexagonal shaped first bodies A and triangular shaped second bodies B and C.
Figure 13:
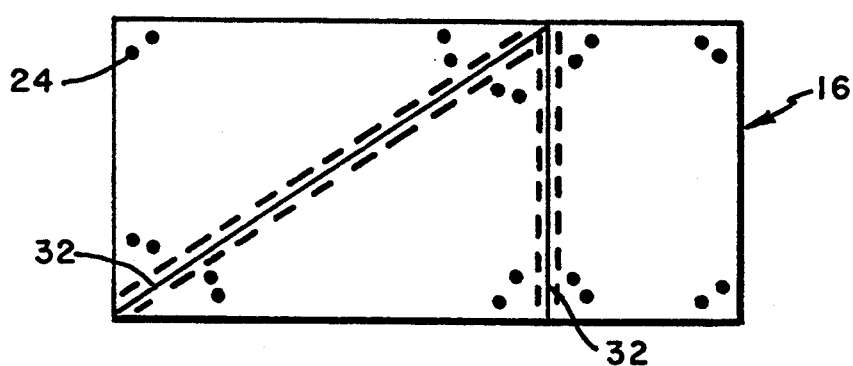
FIGS. 13 to 20 are preferred planar bodies for use in the practice of this invention.
Figure 14:
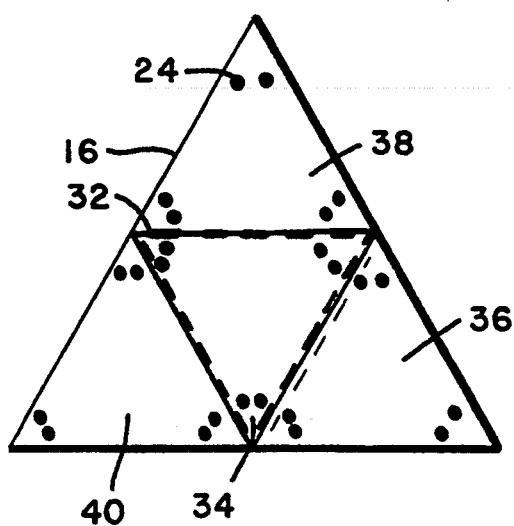
Figure 15:
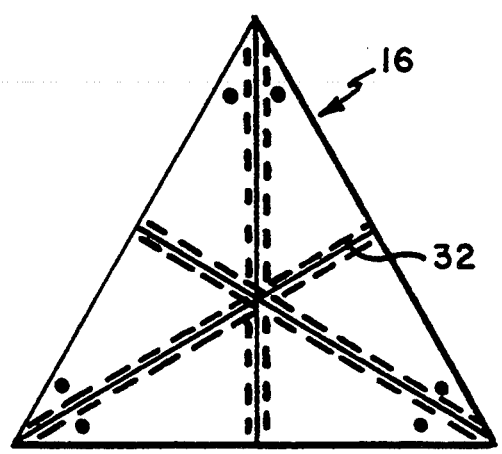
Figure 16:
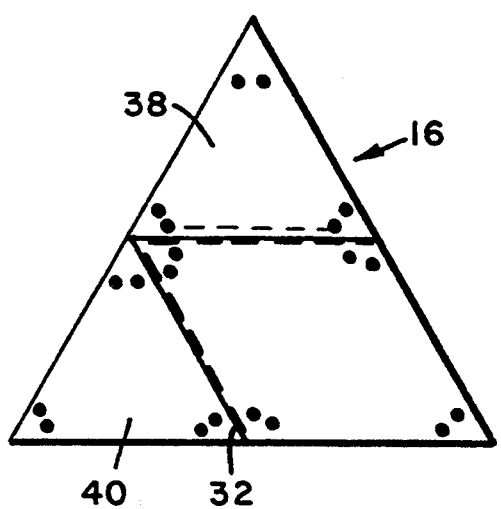
Figure 17:
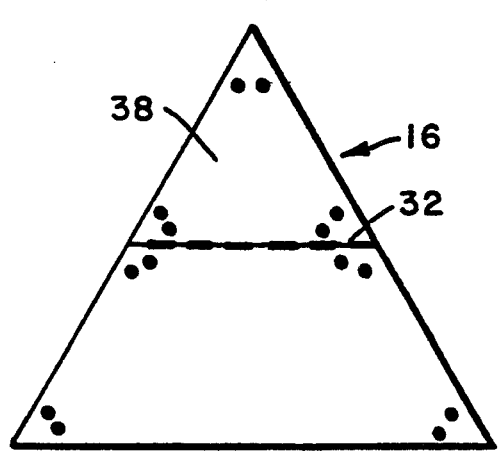
Figure 18:
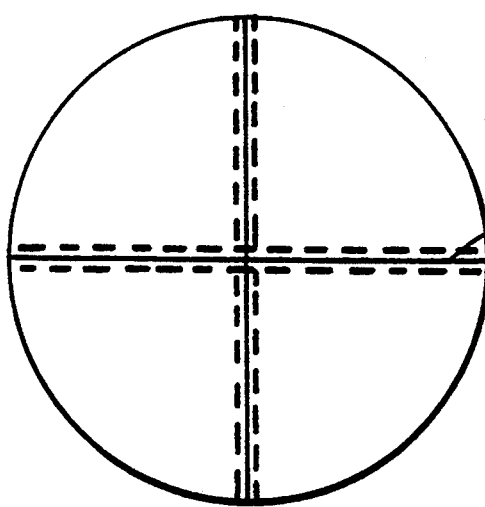
Figure 19:
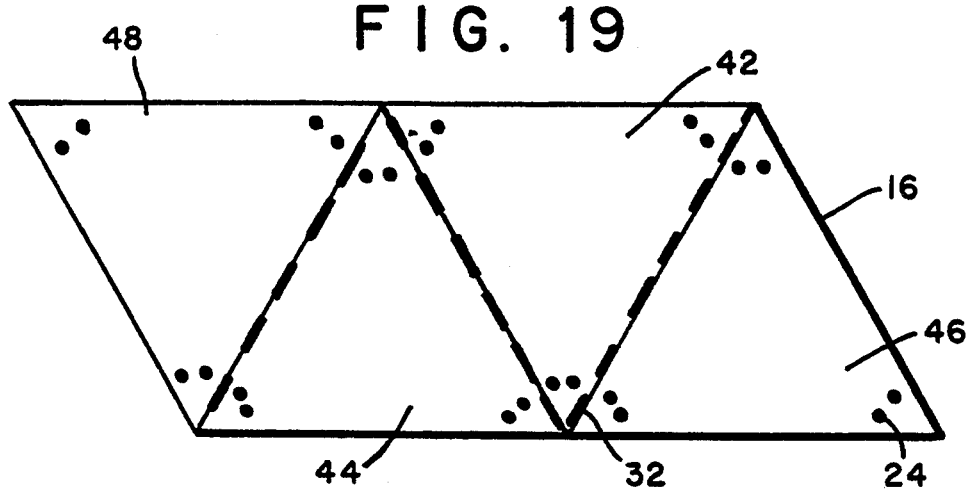
Figure 20:
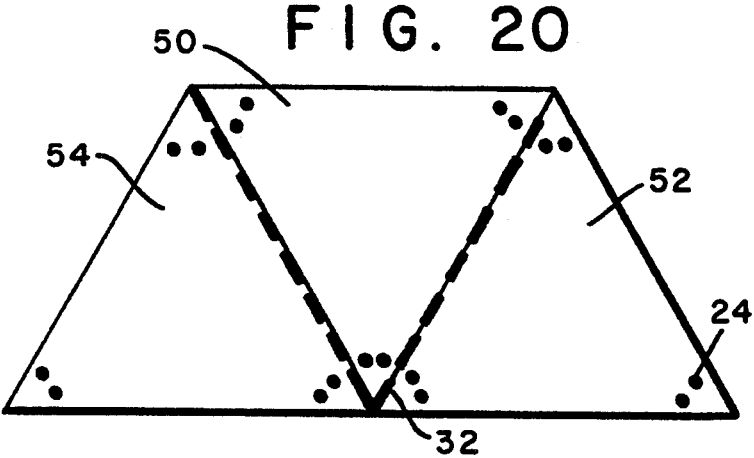

FIG. 12 is a depiction showing the relative positions of surface planar bodies 24 and sandwiched planar bodies 26 in the embodiment of FIG. 5 in which layers 14, 16, 28 and 30 are removed to illustrate the degree of coverage. As depicted FIG. 12 (which is an overhead view of the embodiment of FIG. 5 with layers 20 and 22 removed), the relative positions of the planar bodies provide for a high degree of surface coverage. Sandwiched hexagonal planar bodies 26 are identified by A, the surface triangular planar bodies 24 adjacent to cover layer 14 are identified by C and triangular planar bodies 24 adjacent to backing layer 16 are identified by B. In the preferred embodiments of the invention depicted in FIGS. 5 to 11, planar bodies 24 and 26 cover at least about 85 area percent of its corresponding unfilled region 22. The coverage is such that preferably more than about 90 area %, more preferably more than about 95 area % and most preferably about 100% of one or both surfaces of unfilled region 22 is covered by its corresponding planar body 24. In the embodiments of choice, planar body 24 is uniformly larger than its corresponding unfilled region 22 such that overlap of planar bodies 24 and 26 in filled region 20 occurs. This overlap insures that area 100 area % coverage of the desired area is provided and the area % coverage is not substantially reduced due to disalignment of planar bodies 24 and corresponding unfilled regions 22. As shown in the Figures, the position of planar bodies 24 can vary widely. For example, planar bodies 24 may be on both surfaces base layer 18 or on only one surface of layer 18 or may be affixed to the surfaces of cover layer 14 and/or backing layer 16 by way of eyes 48. (See FIGS. 13 to 20). However, in all cases bodies 24 are positioned that no body 24 directly contacts another body 24 or a sandwiched body 26. The result is (as depicted in FIGS. 6, 7 and 8) substantial coverage of the area to be protected by bodies 24 and 26. At the same time this construction provides a significant reduction in noise when the article is used due to the lack of contact between planar bodies. Another major advantage of this arrangement is that varying degrees of overlap by bodies 24 and 26 can be achieved to provide improved protection. As depicted in FIGS. 5 to 8, planar bodies 24 are preferably space filling and are positioned to provide more than one, preferably two or three and more preferably at least three flexible semi-continuous or continuous seams (preferably continuous over the area to be protected) in different directions which preferably intersect at an angle with each other (preferably at an angle of about from about 30° to about 150° more preferably at an angle of from about 60° to about 120°, and most preferably at an angle of 60° with at least one other seam) in order to allow flexing in multiple directions along the seams.

The number of planar bodies 24 may vary widely, the only requirement is that for the area being protected there is at least one planar body 24 bound to a surface of each unfilled region 22 within the area to be protected.

The shape of planar bodies 24 and the area percent of layer 18 covered by planar bodies 24 may vary widely and will generally depend on the shape and positioning of sandwiched bodies 26 and unfilled regions 22. As shown in FIGS. 6, 7 and 8, this is preferably accomplished by dividing planar bodies 24 and 26 covering a particular area to be protected into repeat units composed of three planar bodies in which at least one planar body is a sandwiched planar body 26 and in which at least one planar body is a surface planar body 24, wherein the surface planar bodies 24 are of a size and shape and are positioned such that they completely or partially cover a unfilled area 22. For example, as depicted in FIG. 6, one element is constrained between layers 28 and 30 by some suitable means as for example, sewing, lamination, gluing or the like to form a filled region 20 sandwiched planar body 26. Surface planar bodies 24 are positioned on the surface of base layer 18 on both sides of filled region 24. Alternatively, as depicted in FIG. 7 planar bodies 24 can be positioned on opposite sides of base layer 18, or two elements may be contrained between layers 28 and 30 (not depicted).

In the preferred embodiments of the invention, the repeat unit is formed by sub-dividing a larger body into three smaller bodies. As depicted in FIG. 12, the repeat unit comprises triangular shaped planar surface bodies B and C, and sandwiched hexagonal shaped planar body A. As can be readily seen, this repeat unit is formed by sub-dividing various larger bodies which can be sub-divided into at least two triangular shaped bodies and one hexagonal shaped body. Such larger bodies include trapezoid, parallogram or other shaped bodies.

For many applications where relatively high penetration resistance and flexibility are desired, such as a ballistic resistant vest, it is desirable to affix planar bodies 24 to base layer 18 such that the desired flexibility is obtained. As shown in the Figures, this is preferably accomplished by affixing planar bodies 24 as discontinuous geometric shapes. In these applications, it is preferred that the planar bodies 24 as well as planar bodies 26 include penetration resistant structures formed from rigid ballistic resistant materials. Preferred geometric shapes will be space filling and will provide three different directions for continuous or semi continuous (preferably continuous) seams, where seam directions are preferably at an angle to each other (more preferably at an angle of about 60°) in order to allow flexing in multiple directions. Such constructions regardless of the thickness and rigidity of planar bodies 24 and planar bodies 26 can drape around doubly curved surfaces and thus exhibit the desired flexibility. Primarily because of the improved flexibility, a preferred construction consists of an arrangement of triangular shaped bodies (preferably right angle triangles, equilateral triangles or a combination thereof and more preferably equilateral triangles) (See FIGS. 13, 14, 15 and 16) which are arranged to be space filling and are positioned such that three flexible continuous seams are formed which intersect at 60° along which article 10 can flex. As depicted in FIG. 12, a more preferred modification to this construction is the inclusion of compatible geometric shapes such as hexagons, parallelograms, trapezoids and the like, (especially hexagons (See FIGS. 17, 18, 19 and 20)) which correspond to shapes obtainable by fusion of two or more triangles at appropriate edges, or shaped bodies which are formed by sub-dividing such compatible geometric shapes. As depicted in FIG. 12 the most preferred compatible geometric shape is a hexagon (See FIGS. 17 to 20). The use of combinations of equilateral triangles and hexagons where at least one body is between two flexible layers and at least one body is on a surface of the two layers as depicted in FIGS. 5 and 12 is flexible layers and at least one body is on a surface of the two layers as depicted in FIGS. 5 and 12 is especially preferred because of the reduced number of seams as compared to composites were the bodies all are triangular shaped. The result is better protection with substantially no reduction in flexiblity. It should be noted that while in FIG. 5 the hexagonal shaped sandwiched bodies 26 are positioned between layers 28 and 30, and triangular shaped surface bodies 24 are positioned on the same side of base layer 18, such positioning is not critical to the reduction in the number of seams when a combination of triangular and hexagonal shaped bodies are used. The relative positioning of such bodies can be conveniently changed provided that bodies are spaced apart out of contact one from the other, and further provided that the desired degree of protection is provided. (See FIGS. 7 to 11). Such space filling constructions allow a wide range of compromises between flexibility and minimization of seams and penetration resistance. Planar bodies 24 preferably include eyes (not depicted) for stitching planar bodies 24 to a surface of layer 18 by way of stitches.

As depicted in FIGS. 13, 15, 16, 17, 18 and 20 an alternative to discontinuous relatively inflexible geometric shapes is the use of relatively rigid penetration resistant surface planar bodies 24 and/or 26 containing flexible seams 46, such as slits, hinges, creases, perforations and the like, which allow planar bodies 24 and/or 26 to flex along flexible seams 46 relative to the plane of base layer 18. The use of flexible seams 46 can provide for enhanced ballistic protection while at the same time increasing the flexibility of the ballistic article to a significant extent. It is desirable that flexible seams 46 of that flexible seams 46 of each body combine to provide one, two or three or more continuous or semi-continuous seams along more than one seam 46 of planar bodies 24 and/or 26 along which article 10 can easily flex, in an analogous manner to that described previously for those embodiments of the invention having inflexible planar bodies 24 and 26 which are positioned such that article 10 can flex along one or more continuous or semi continous seams.

Planar bodies 24 and 26 are preferably comprised of a rigid material which may vary widely depending on the uses of article 10. The term "rigid" as used in the present specification and claims is intended to include semi-flexible and semi-rigid structures that are capable of being free standing, without collapsing, or in other words materials which are not flexible in Drape Test 1 as described above. Any rigid material can be used in the practice of this invention to form planar bodies 24 and 26 including inorganic materials, such as metals or ceramics, or organic materials such as polymer films, woven and non-woven fabrics, composites and the like of varying thicknesses and rigidities.

For the preferred embodiments of the invention where the composite is penetration resistant the materials employed in the fabrication of planar bodies 24 and 26 may vary widely and may be any penetration resistant material. Ilustrative of such materials are those described in G. S. Brady and H. R. Clauser, *Materials Handbook*, 12th Ed. (1986). Useful materials include high modulus thermosetting resins and thermoplastic polymers such as polyamides as for example aramids, nylon-66, nylon-6 and the like; polyesters such as polyethylene terephthalate, polybutylene terephthalate, and the like; acetalo; polysulfones; polyethersulfones; polyacrylates; acrylonitrile/butadiene/styrene copolymers; poly(amideimide); polycarbonates; polyphenylenesulfides; polyurethanes; polyphenyleneoxides; polyester carbonates polyesterimides; polyimides; polyetherimides; polyesteramides; polyetheretherketone; epoxy resins; phenolic resins; polysulfides; silicones; phenolic cyanate resins, polyacrylates; polyacrylics; polydienes; vinyl ester resins, modified phenolic resins; unsaturated polyester; allylic resins; alkyd resins, melamine and urea resins; polymer alloys and blends one or more of thermoplastic resins thermosetting resins and combinations one or more thereof; and interpenetrating polymer networks such as those of polycyanate ester of a polyol such as the dicyanoester of bisphenol-A and a thermoplastic such as a polysulfone or polyethersulfone.

Planar bodies 24 and 26 may comprise a network of fibers as for example those described for use in the fabrication of layers 20 and 22 preferably aramid fibers, such as Kevlar® 29,49, 129 and 149 aramid fibers, polyethylene fibers such as Spectra® 900 and Spectra® 1000 polyethylene fibers and combinations thereof dispersed in a matrix of one of more polymeric materials such as one or more thermoplastic resins one or more thermosetting resins or a combination thereof, such as polymers used to form the fibers of layers 20 and 22. In these embodiments of the invention, the fibers are dispersed in a continuous phase of a matrix material which preferably substantially coats each filament contained in the fiber. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like. One such suitable arrangement is where the polymeric layer comprises a plurality of layers or laminates in which the coated filaments are arranged in a sheet-like array and aligned parallel to one another along a common filament direction. Successive layers of such coated, uni-directional filaments can be rotated with respect to the previous layer to form a relatively flexible composite. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. Techniques for fabricating these laminated structures are described in greater detail in U.S. Pat. Nos. 4,916,000; 4,623,574; 4,748,064; 4,457,985 and 4,403,012.

Useful materials for the fabrication of planar bodies 24 and 26 also include multilayered fabric or fibrous composites in which the fabric or fibrous layers are secured by some securing means as for example stitching, adhesive, bolts, staples and the like. These fabrics can be woven armor and can be formed from the fibers described above for use in the fabrication of layers 20 and 22 such as glass fibers, aramid fibers (such as Kevlar® 29, 49, 129 and 149 aramid fibers) polyethylene fibers (such as Spectra® 900 and Spectra® 1000 polyethylene fibers) and combinations thereof.

Planar bodies 24 and 26 may also be formed from metal and non-metal ceramics. Illustrative of useful metal and non-metal ceramics are as those described in C. F. Liable, *Ballistic Materials and Penetration Mechanics*, Chapters 5–7 (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_{23}$), europium oxide: (EuO, $Eu_2O_3$, and $Eu_2O_4$), ($Eu_{16}O_{23}$), gadolinium oxide ($Gd_2O_3$), hafnium oxide ($HfO_2$), holmium oxide ($Ho_2O_3$), lanthanum oxide ($La_2O_3$) , lutetium oxide ($Lu_2O_3$), magnesium oxide (MgO), neodymium oxide ($Nd_2O_3$), niobium oxide: (NbO, $Nb_2O_3$, and $NbO_2$), ($Nb_2O_5$), plutonium oxide: (PuO, $Pu_2O_3$, and $PuO_2$), praseodymium oxide: ($PrO_2$, $Pr_6O_{11}$, and $Pr_2O_3$), promethium oxide ($Pm_2O_5$), samarium oxide (SmO and $Sm_2O_3$), scandium oxide ($Sc_2O_3$), silicon dioxide ($SiO_2$), strontium oxide (SrO), tantalum oxide ($Ta_2O_5$), terbium oxide ($Tb_2O_3$ and $Tb_4O_7$), thorium oxide ($ThO_2$), thulium oxide ($Tm_2O_3$), titanium oxide: (TiO, $Ti_2O_3$, $Ti_3O_5$ and $TiO_2$), uranium oxide ($UO_2$, $U_3O_8$ and $UO_3$), vanadium oxide (VO, $V_2O_3$, $VO_2$ and $V_2O_5$), ytterbium oxide ($Yb_2O_3$), yttrium oxide ($Y_2O_3$), and zirconium oxide ($ZrO_2$). Useful ceramic materials also include boron carbide, zirconium carbide, beryllium carbide, aluminum beride, aluminum carbide, boron carbide, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, lead zirconate titanate/PLZT, alumina-titanium carbide, alumina-zirconia, zirconia-cordierite/ZrMAS; the fiber reinforced ceramics and ceramic alloys; and glassy ceramics.

Useful materials for fabrication of planar bodies 24 and 26 include metals such as nickel, manganese, tungsten, magnesium, titanium, aluminum and steel plate. Illustrative of useful steels are carbon steels which include mild steels of grades AISI 1005 to AISI 1030, medium-carbon steels of grades AISI 1030 to AISI 1055, high-carbon steels of the grades AISI 1060 to AISI 1095, free-machining steels, low-temperature carbon steels, rail steel, and superplastic steels; high-speed steels such as tungsten steels, molybdenum steels, chromium steels, vanadium steels, and cobalt steels; hot-die steels; low-alloy steels; low-exapnsion alloys; mold-steel; nitriding steels for example those composed of low-and medium-carbon steels in combination with chromium and aluminum, or nickel, chromium and aluminum; silicon steel such as transformer steel and silicon-manganese steel; ultrahigh-strength steels such as medium-carbon low alloy steels, chromium-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromium-manganese steel. Useful materials also include alloys such a manganese alloys, such as manganes aluminum alloy, manganese bronze alloy; nickel alloys such as, nickel bronze, nickel cast iron alloy nickel-chromium alloys, nickel-chromium steel alloys, nickel copper alloys, nickel-molybdenum iron alloys, nickel-molybdenum steel alloys, nickel-silver alloys, nickel-steel alloys; iron-chromium-molybdenum-cobalt-steel alloys; magnesium alloys; aluminum alloys such as those of aluminum alloy 1000 series of commercially pure aluminum, aluminum-manganese alloys of aluminum alloy 300 series, aluminum-magnesium-manganese alloys, aluminum-magnesium alloys, aluminum-copper alloys, aluminum-silicon-magnesium alloys of 6000 series, aluminum-copper-chromium of 7000 series, aluminum casting alloys; aluminum brass alloys and aluminum bronze alloys.

As depicted in FIGS. 5, 6, 7, 8 and 9 in cross-section, article 10 comprises a cover layer 14 and backing layer 16, each consisting of a one or more substrate layers 36, stitched together by horizontal stitches 38 and vertical stitches (not depicted). Layer 14 is the outer layer which is exposed to the environment, and layer 16 is the inner layer closest to the body of the wearer. As depicted in FIGS. 4, 5 and 6, article 10 is comprised of one cover layer 14 which includes substrate four layers 14(a), 14(b), 14(c) and 14(d) and backing layers 16 which includes four substrate layers 16(a), 16(b), 16(c) and 16(d). However, the number of layers 14 and 16 and their component substrate layers included in article 10 may vary widely, provided that at least one layer 14 and one layer 16 each having at least one substrate layer are present. In general, the number of layers in any embodiment will vary depending on the degree of penetration resistance and flexibility desired. The number layers 14 and 16 is preferably from 1 to about 70, each preferably having from 1 about 50 substrate layers. In the more preferred emobdiments of the invention, layers 14 and 16 of article 10 include from about 1 to about 20 distinct layers. The number of layer forming layers 14 and layers 16 are preferably different. In the most preferred embodiments of the invention, the number of layers included in layer 14 is kept at a minimum. In these embodiments of the invention, layer 16 includes a larger number of layers and functions to catch and hold fragments from the threat and/or portions of planar bodies 24 or 26 resulting from the impact of the threat from harming the wearer. In the embodiments the article includes less than about 10 layers 14, preferably 1 to about 5 layers 14, and from about 10 to about 20 layers 16.

As shown in FIG. 5, substrate layers 14(a), 14(b), 14(c) and 14(d) of cover layer 14, and substrate layers 16(a), 16(b), 16(c) and 16(d) of backing layers 16 secured together by horizontal securing means and vertical securing means (not depicted). In the illustrative embodiments of the invention depicted in the figures, securing means is stitching; however, any conventional securing means may be used including but not limited to bolts, rivets, adhesive, staples, stitches, and the like. While in the embodiment of the figures all substrate layers of cover layer and of backing layer 14 or 16 are secured together, it is contemplated that the number of layers 14 or 16 secured together may be as few as two, or any number of layers 14 or 16 in article 10 in any combination. In the preferred embodiments of the invention where the number of layers 14 or 16 is more than about 20, all the layers are not secured together. In these embodiments, from about 2 to about 20 layers, preferably from 2 to about 12 layers, more preferably from about 2 to about 10 layers and most preferably from about 2 to about 8 of layers 14 and or layers 16 are secured together forming a plurality of packets (not depicted).

Substrate layers of cover layer 14 and backing layer 16 may also be secured together by lamination or an adhesive, or a combination of lamination and adhesive and stitching. In the preferred embodiments of the invention depicted in FIG. 3, stitches are utilized to secure substrate layers of cover layer 14 and backing layer 16. The type of stitching and stitching methods employed may vary widely and include those described herein above for use in stitching layers 28 and 30 to form unfilled regions 22. Useful threads and fibers may vary widely and may be selected from those used to stitch layers 28 and 30. However, the thread or fiber used in stitching substrate layers of cover layer 14 and of backing layer 16 is preferably an aramid fiber or thread (as for example Kevlar ® 29, 49, 129 and 149 aramid fibers), an extended chain polyethylene thread or fiber (as for example Spectra ® 900 and Spectra ® 1000 polyethylene fibers) or a mixture thereof.

Materials used in the fabrication of cover layer 14 and backing layer 16 may vary widely, the only requirement is that it is flexible as defined above. For example, cover layer 14 and backing layer 16 may be a flexible polymeric or elastomeric film formed from a thermoplastic or elastomeric resin as described above. Still other useful materials for the fabrication of layers 14 and 16 are networks of fibers as for example those described for use in the fabrication of layers 28 and 30 preferably aramid fibers, such as Kevlar ® 29,49, 129 and 149 polyethylene fibers such as Spectra ® 900 and Spectra ® 1000 polyethylene fibers and combinations thereof. Illustrative of fibrous networks are woven and nonwoven fabrics either alone or a network of such fibers dispersed in a matrix of one of more polymeric materials such as one or more thermoplastic resins one or more thermosetting resins or a combination thereof. Such fibrous networks are described hereinabove in the description of materials used to form the fibers of layers 28 and 30. In one preferred embodiment of the invention, layers 14 and 16 are formed from fibers which are dispersed in a continuous phase of a matrix material which preferably substantially coats each filament contained in the fiber. The manner in which the filaments are dispersed may vary widely. The filaments may be aligned in a substantially parallel, unidirectional fashion, or filaments may by aligned in a multidirectional fashion with filaments at varying angles with each other. In the preferred embodiments of this invention, filaments in each layer are aligned in a substantially parallel, unidirectional fashion such as in a prepreg, pultruded sheet and the like. One such suitable arrangement is where the polymeric layer comprises a plurality of layers or laminates in which the coated filaments are arranged in a sheet-like array and aligned parallel to one another along a common filament direction. Successive layers of such coated, uni-directional filaments can be rotated with respect to the previous layer to form a relatively flexible composite. An example of such laminate structures are composites with the second, third, fourth and fifth layers rotated +45°, −45°, 90° and 0°, with respect to the first layer, but not necessarily in that order. Other examples include composites with 0°/90° layout of yarn or filaments. Techniques for fabricating these laminated structures are described in greater detail in U.S. Pat. Nos. 4,916,000; 4,623,574; 4,748,064; 4,457,985 and 4,403,012.

The articles of this invention may be fabricated through use of conventional techniques. For example, bodies 24 may be sewn to a layer using conventional sewing techniques, preferably at one or more points of body 24, more preferably a distance from the edge of a body 24. By sewing a distance from the edge of body 16 flexibility is enhanced. To prevent extensive disalignment between various layers, adjacent layers can be stitched together. The thread used to stitch bodies 24 to substrate layers 14 can vary widely, but is preferably a relatively high modulus (equal to or greater than about 200 grams/denier) and a relatively high tenacity (equal to or greater than about 15 grams/denier) fiber. All tensile properties are evaluated by pulling a 10 in. (25.4 cm) fiber length clamped in barrel clamps at 10 in/min (25.4 cm/min) on an Instron Tensile Tester. In the preferred embodiments of the invention, the modulus of the fiber is from about 400 to about 3000 grams/denier and the tenacity is from about 20 to about 50 grams/denier, more preferably the modulus is from about 1000 to about 3000 grams/denier and the tenacity is from about 25 to about 50 grams/denier; and most preferably the modulus is from about 1500 to 3000 grams/denier and the tenacity is from about 30 to about 50 grams/denier. Useful threads and fibers may vary widely and include those described herein below in the discussion of fiber for use in the fabrication of layers 28 and 30. However, the thread or fiber used in stitching means is preferably an aramid fiber or thread (as for example Kevlar 29, 49, 129 and 141 aramid fiber), an extended chain polyethylene thread or fiber (as for example Spectra 900 fiber and Spectra 1000 polyethylene fiber) or a mixture thereof.

Figure 10:
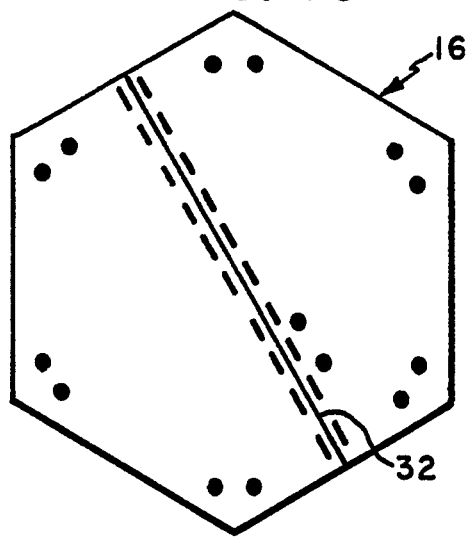
FIG. 10 is a fragmentary sectional view of a body armor of this invention similar to that of FIG. 4 taken along line 4—4' in which surface bodies 40 are attached to layer 38.

A further embodiments of this invention is depicted in FIG. 10. This embodiment comprises an cover layer 32 which is exposed to the environment, and a backing layer 34 which is closest to the body of the wearer. This embodiment of the invention comprises two layers 36. Each layer 36 comprises a plurality of composite planar bodies 40 on a surface of a flexible layer 38. Layer 38 can be formed from the same materials used to form layers 28 and 30 of article 10 of FIGS. 5 to 9, and planar bodies 40 may be formed from the same materials as used to form planar bodies 24 and 26 of article 10 of FIGS. 5 to 9. Planar bodies 40 are affixed to layer 38 by some suitable method, such as stitches, adhesives, lamination or a combination thereof (not depicted) to form a pattern of covered areas 42 and uncovered areas 44. As shown in FIG. 10, the plurality of planar bodies 40 are positioned on the surfaces of the two layers 38 such that the covered areas 42 on one layer 38 are in alignment with the uncovered areas 44 on the adjacent layer 38. In the preferred embodiments of the invention depicted in FIG. 10, each planar body 40 is uniformly larger than its corresponding uncovered area 44, such that planar bodies 40 adjacent to an uncovered area 44 partially overlap with the corresponding planar bodies 40 of the adjacent composite layer 36 by some portion 46. The degree of overlap may vary widely, but in general is such that preferably about 100 area % of the uncovered areas 44 of layer 38 is covered by its corresponding planar body 40 of another layer 38.

FIG. 11 depicts a variant of the embodiment of FIGS. 5, 6 and 7 in which corresponding parts are referred to by like numerals. The embodiments of FIG. 11 differs from that of the preceeding figures in that planar bodies 24 and 26 are sandwiched between layers 28 and 30.

The composites of this invention can be used for conventional purposes in the construction of articles of manufacture where flexibility is required and areal coverage by rigid portions are required to provide some desirable feature but where such portions are not flexible enough to be used as a continuous sheet. Such applications include use of the composites in the fabrication of articles of manufacture for control of transmission, absorption, reflection and deflection of electromagnetic radiation (i.e. radio, infrared, visible, UV, X-ray, etc), accoustical energy, flames, fluids (i.e. gases and liquids) and solids. Other uses of the composite of this invention include the fabrication of flexible insulating articles of manufacture such as blankets, clothing, sleeping bags, tarps, tents, personal floation gear and the like; the fabrication of backing material for articles of manufacture for reduction of blunt trauma from threats such as bullets, baseballs, hockey pucks, and the like; the fabrication of vehicle paneling; the fabrication of protective apparel and equipment for protection against wild or domestic animals, for protection of motorcyclists, and for protection of personnel working with dangerous equipment (i.e. meat cutter, timber cutters, etc), or engaging in other activities with protection tailored to specific needs; the fabrication of blankets for furniture moving; the fabrication of wet suits for scuba divers; the fabrication of bomb blankets; and the like. Still other applications include use to accessorize clothing, for example, changing the visibility of the wearer.

In the preferred embodiments of this invention, the composites can be used in the fabrication of penetration resistant articles and the like using conventional methods. Such penetration resistant articles include bullet or puncture proof vests, meat cutter aprons, protective gloves, curtains, wall panels, canopies, boots, tents, fishing gear and the like.

The composites of this invention are particularly useful in the fabrication of "bulletproof" vests or ballistic resistant articles such as "bulletproof" lining for example, or a raincoat because of the flexibility of the article and its enhanced ballistic resistance. In ballistic studies, the specific weight of the shells and plates can be expressed in terms the areal density (ADT). This areal density corresponds to the weight per unit area of the ballistic resistant armor. In the case of filament reinforced composites, the ballistic resistance of which depends mostly on filaments, another useful weight characteristic is the filament areal density of the composite. This term corresponds to the weight of the filament reinforcement per unit area of the composite (AD).

The following examples are presented to provide a more complete understanding of the invention and are not to be construed as limitations thereon.

EXAMPLE 1

Several composites of this invention were fabricated and evaluated for flexibility and for noise reduction. The fabrication and evaluation procedures employed are as follows.

I. Composite Fabrication

A. Composite 1

Figure 21:
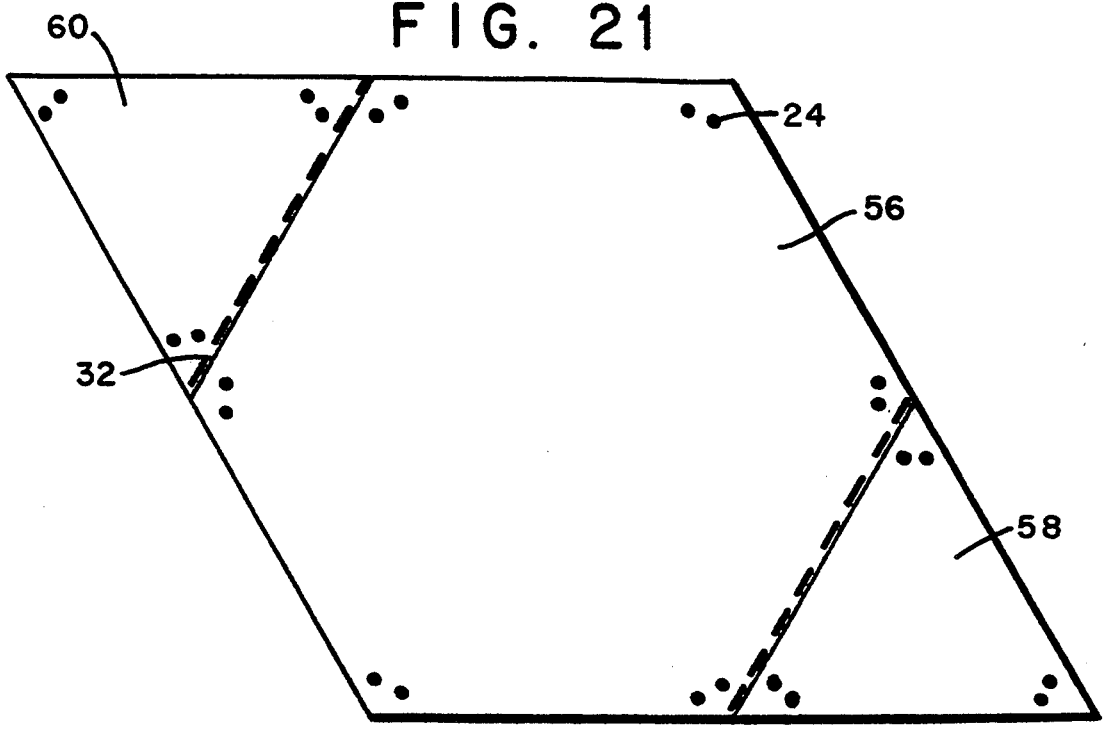
FIG. 21 is a schematic of a linearly truncated triangular planar body on a fabric grid for use in composite of Example 1 to reduce contact between adjacent triangular bodies.
Figure 22:
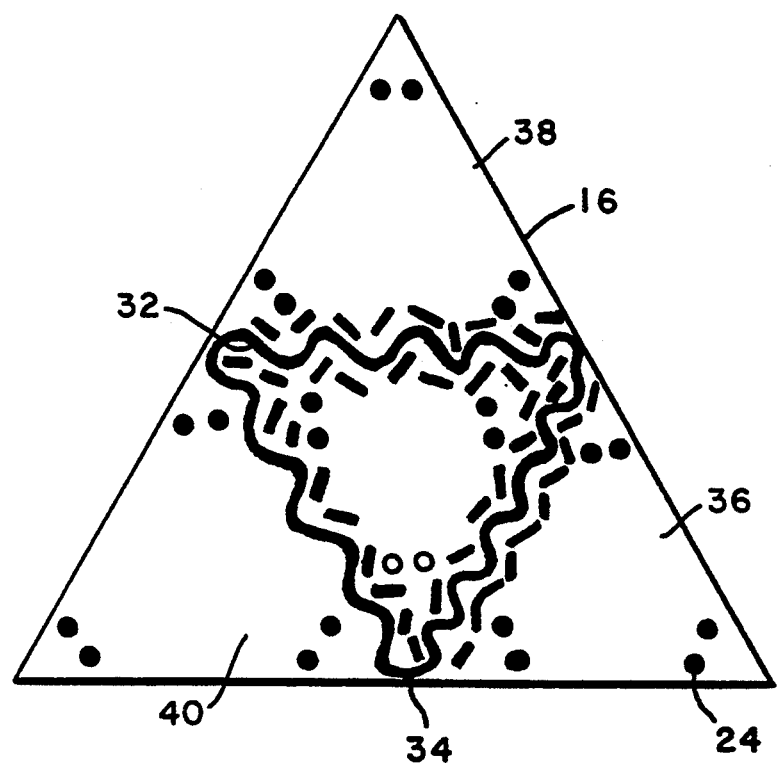
FIG. 22 is a depiction of the arrangement of triangular shaped bodies sewn onto both sides of a fabric layer in composite 1 of Example 1.
Figure 23:
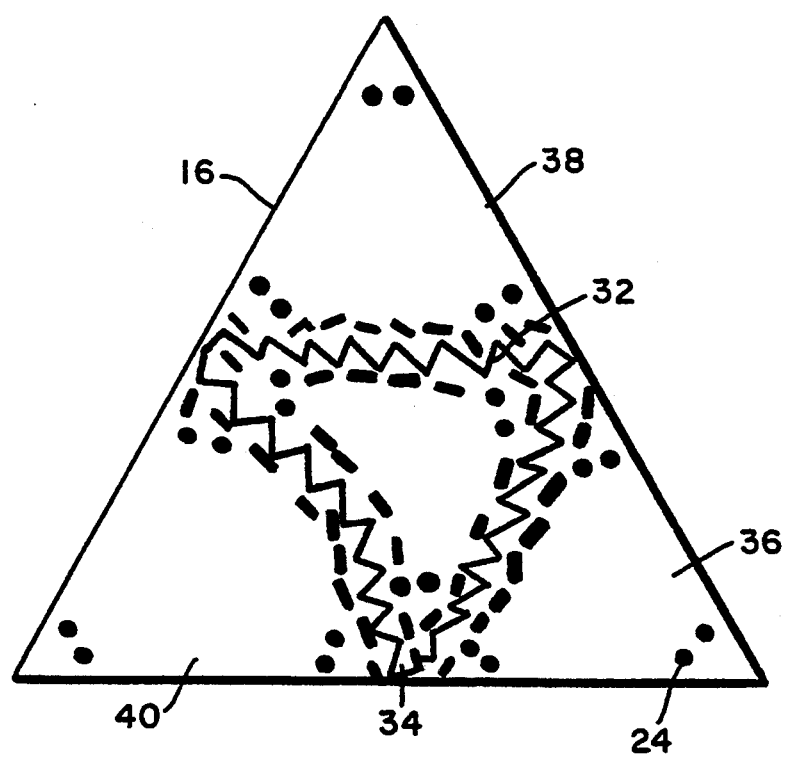
FIG. 23 is a schematic of a non-linearly truncated triangular planar body which reduces the amount of the fabric layer not covered by the planar body for use in the composites of Example 1.
Figure 24A:
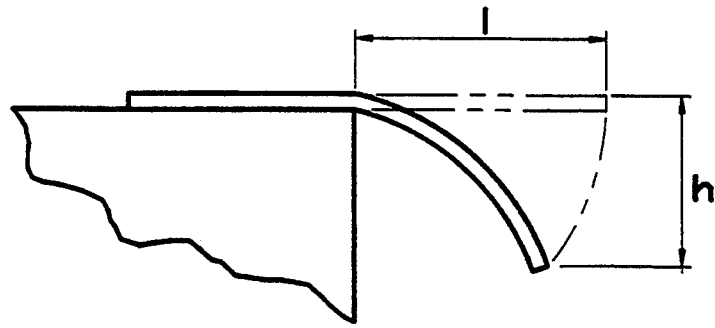
FIG. 24 is a depiction of the arrangement of triangular and hexagonal planar bodies in composite 3.
Figure 24B:
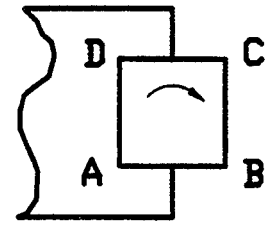
Figure 25A:
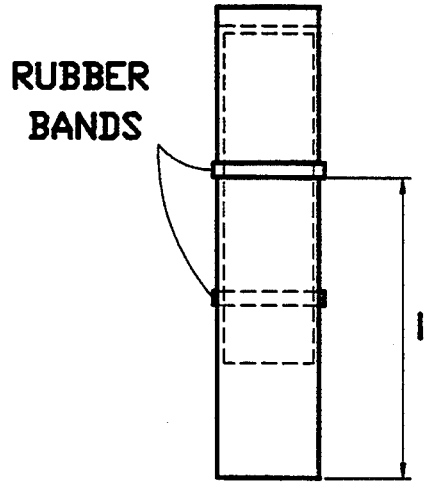
FIG. 25 is a depiction of the arrangement of triangular shaped bodies in comparison composite 1 of Example 1.
Figure 25B:
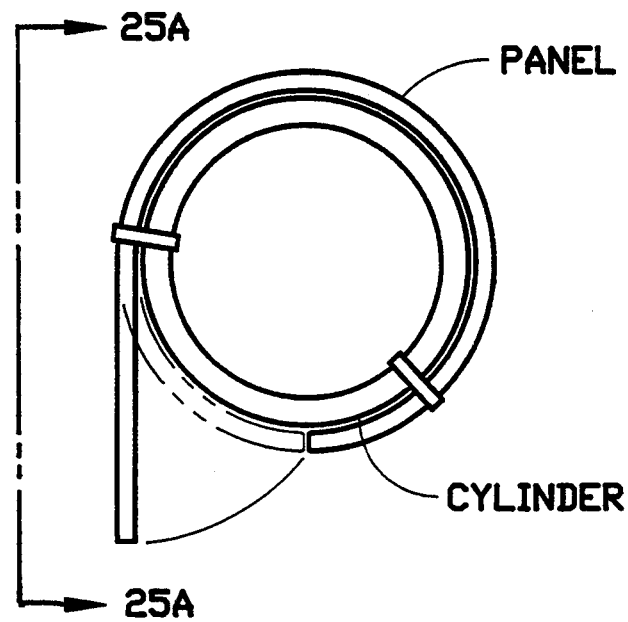
Figure 25C:
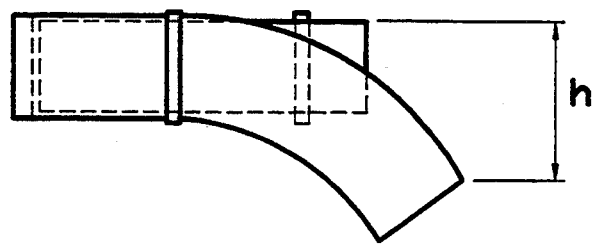

Linearly truncated equilateral aluminum triangles (0.05" (0.127 cm) thick. (See FIG. 21) were sewn onto opposite sides of five fabric layers of ballistic nylon fabric (style 000-26042 from Burlington Industries having 33×33 yarns/in (13×13 yarns/cm)) having an areal density of 0.27 Kg/m$^2$ in the pattern shown in FIG. 22. Alternatively, a non-linearly truncated aluminum plate can be used which minimizes the uncovered area of the fabric layer. (See FIG. 23) Grid size of the equilateral triangular pattern of the fabric had a side length of 1.5 inches (3.8 cm). Three pairs of sewing holes, inset 0.5 inches (1.27 cm) from the truncated apexes and 0.05 inches (0.127 cm) in diameter, were used to sew the aluminum triangles onto the five fabric layers using 580 denier SPECTRA ® 1000 sewing thread.

B. Composite 2

This composite was identical to composite 1 except that 2.3 in. (5.8 cm) triangular bodies were used.

C. Composite 3 and Composite 4

Figure 24:
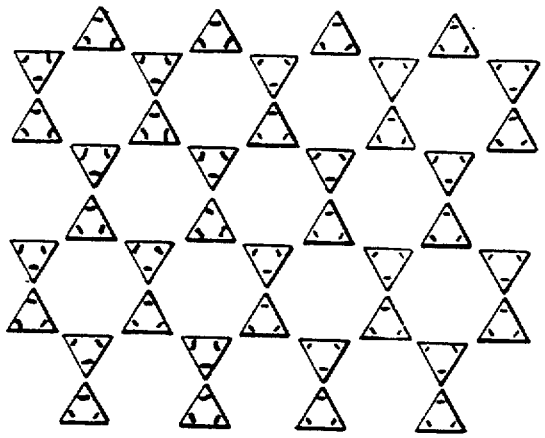
Figure 24:
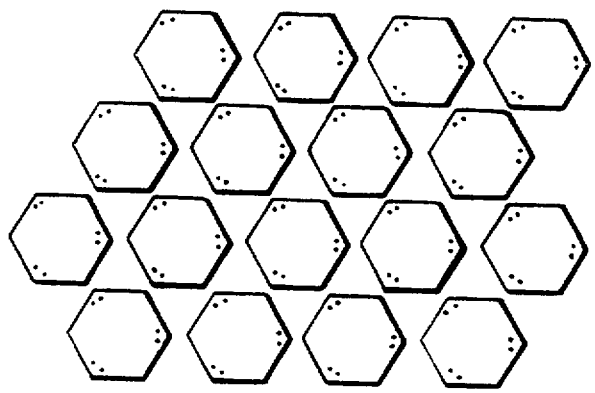

These composites were identical to composite 1 except that hexagons (1.5 in. (3.8 cm) side length) were sewn on the top impact side of the fabric layers with three points of attachment and triangles were sewn on the bottom side in the arrangement of FIG. 24; and in composite 4, the hexagons were sewn on the bottom side with three points of attachment and the triangles were sewn on the impact side with three points of attachment also in the arrangement of FIG. 24.

D. Composites 5 and 6

These composites were identical to composites 3 and 4 respectively, except that the hexagons were attached at six points of attachment near each apex of the hexagon.

E. Comparative Composites 1 and 2

Figure 25:
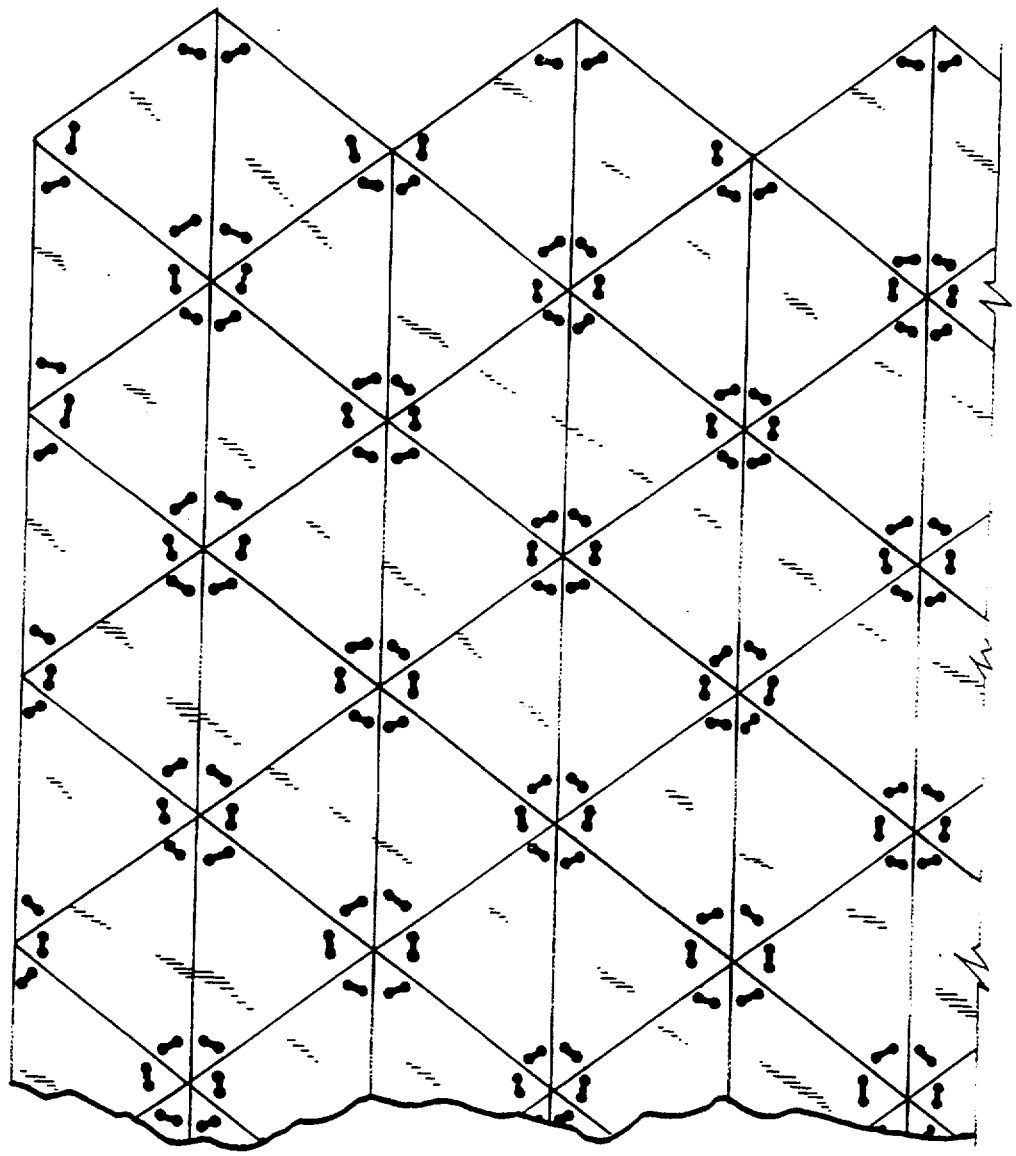

These composites were the same as composite 1, except that all triangles were sewn on the same side of the fabric layer as depicted in FIG. 25. In Comparative Composite 1, triangles were sewn on the top impact side and in Comparative Composite 2, triangles were sewn on the bottom side.

F. Composite 7

Figure 26A:
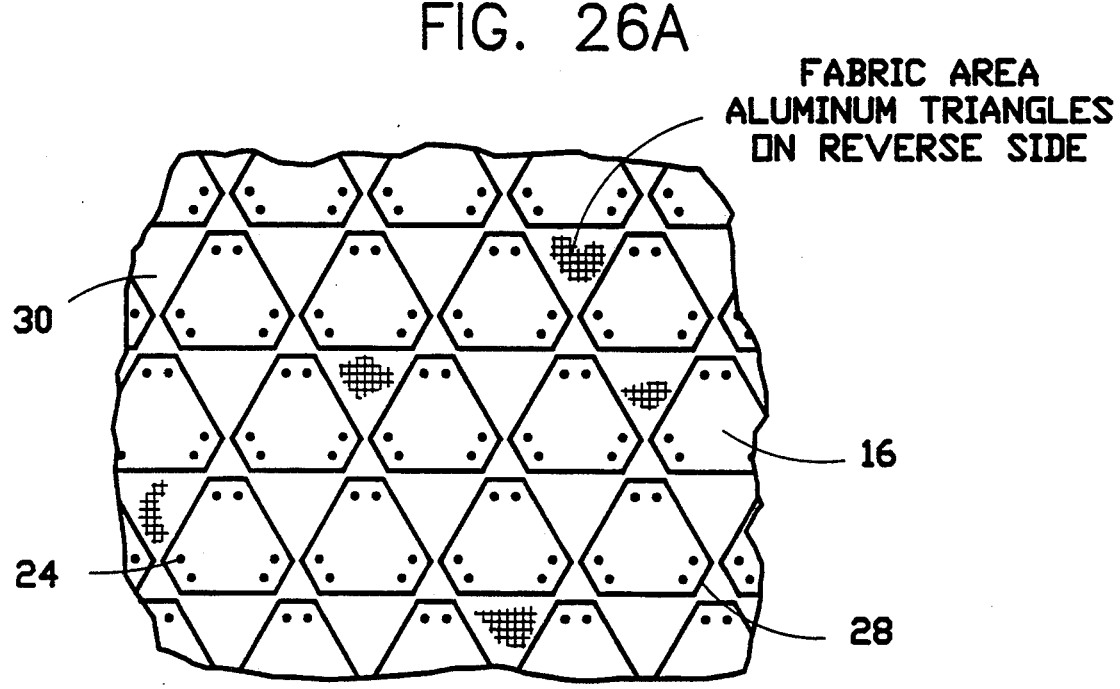
FIG. 26 is a depiction of the arrangement of triangular and hexagonal shaped bodies in composites 7 and 8 of Example 1.

This composite was identical to composites 3 and 4 in materials of construction and the use of hexagonal and triangular shaped bodies, except that the hexagons were sewn between two layers of ballistic nylon fabric using 580 denier SPECTRA ® 1000 thread and the triangles were sewn to both sides of the two layered hexagon construction as depicted in FIG. 26.

G. Composite 8

Figure 26B:
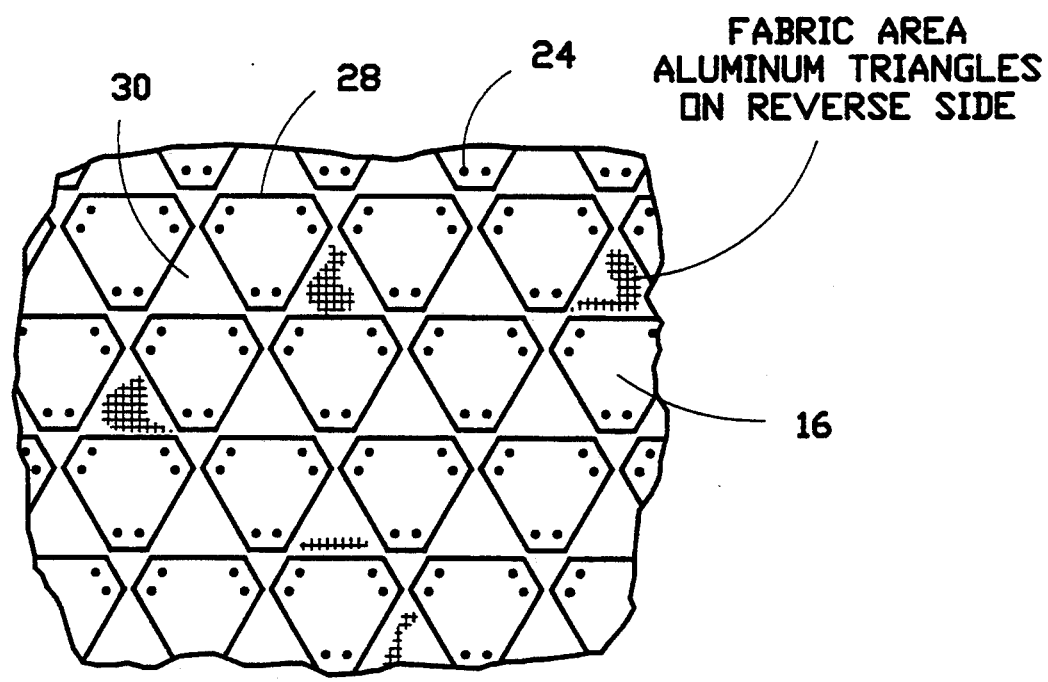
Figure 27:
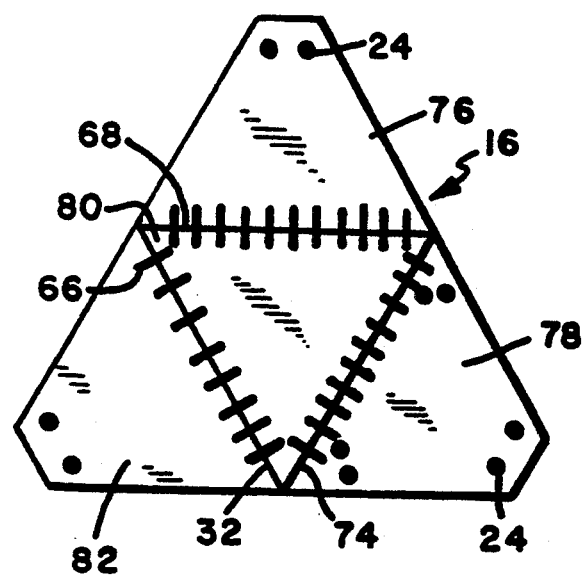
FIG. 27 is a depiction of the arrangement of hexagonal shaped bodies and triangular shaped unfilled regions of the composite 9.
Figure 3:
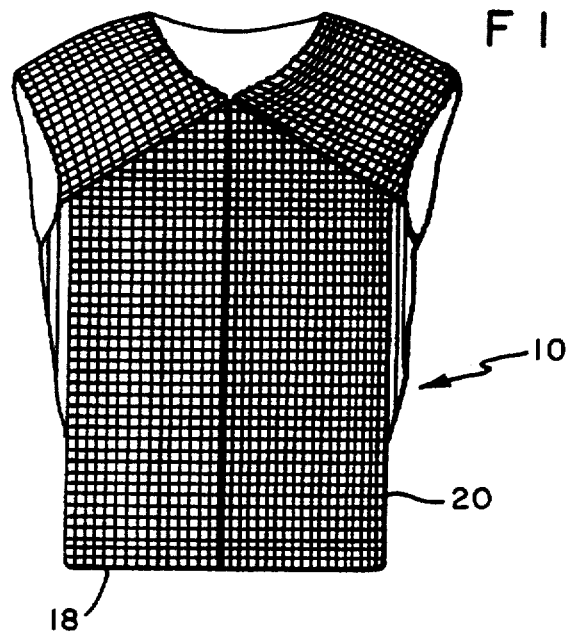
Figure 4:
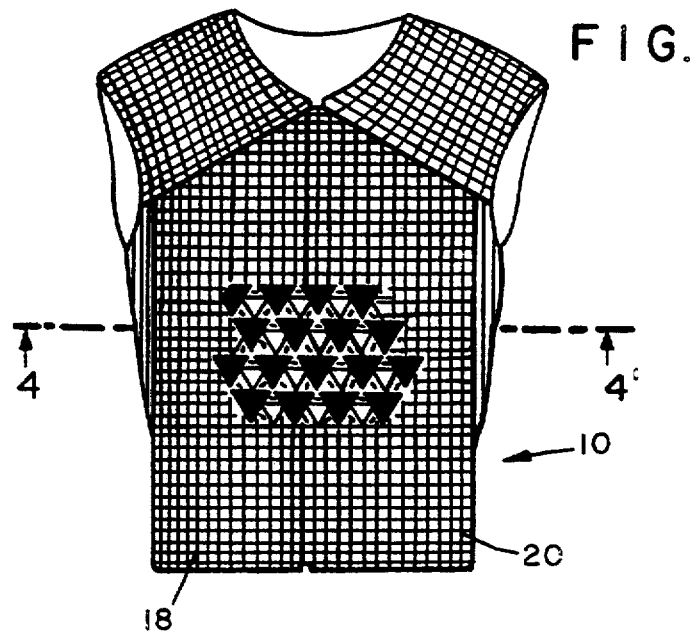
Figure 7:
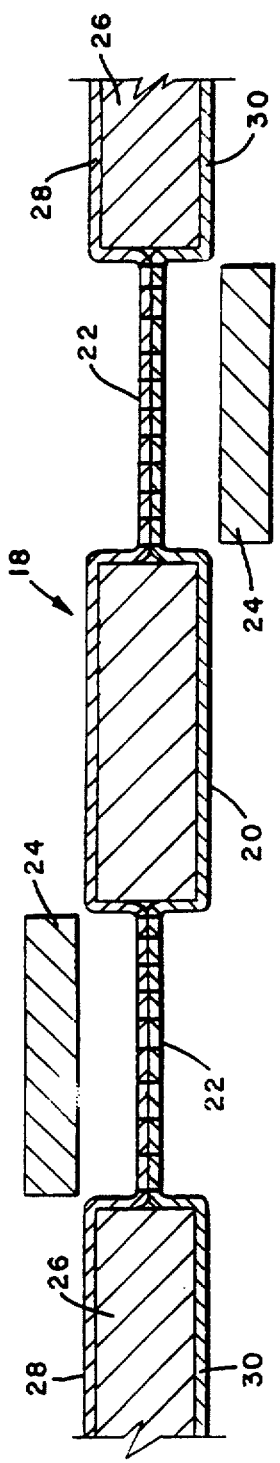
Figure 12:
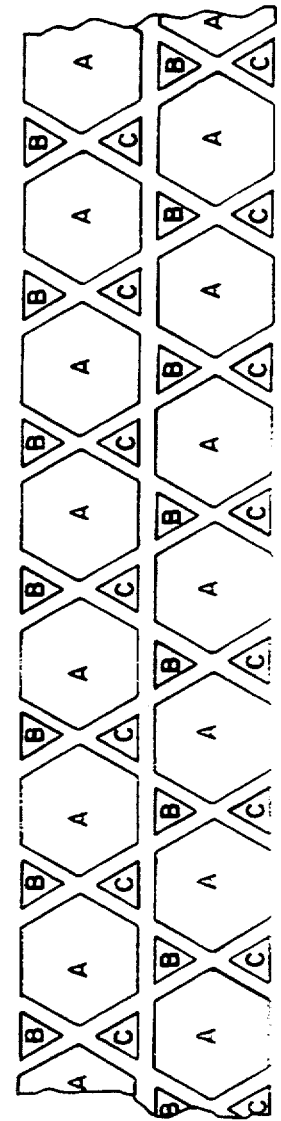
Figure 10:
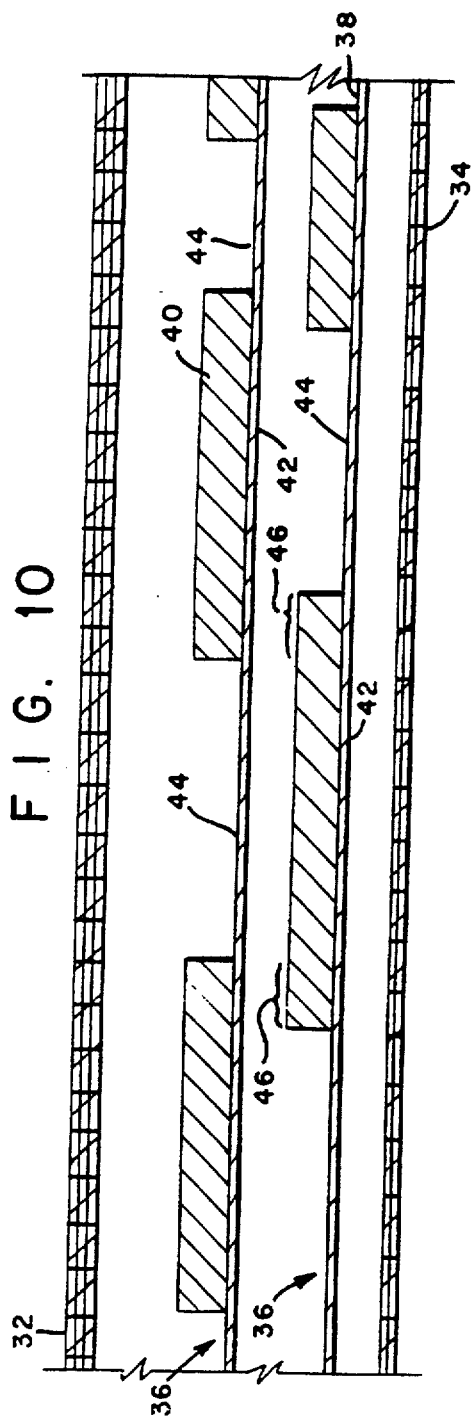
Figure 11:
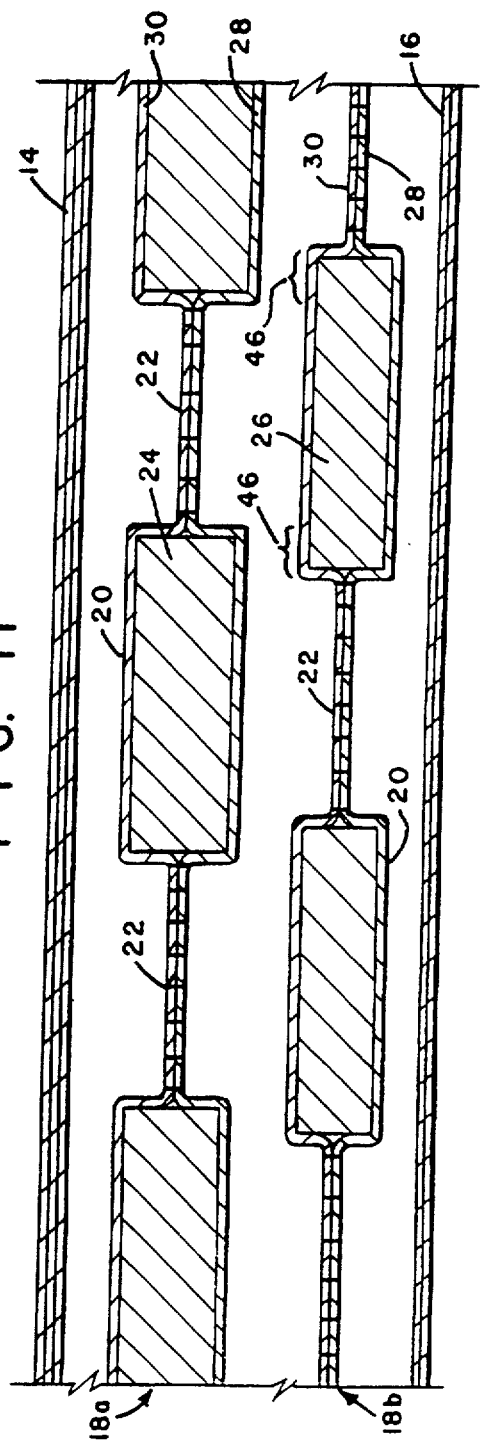
Figure 17:
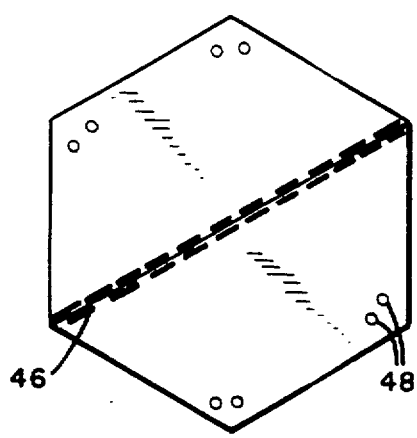
Figure 18:
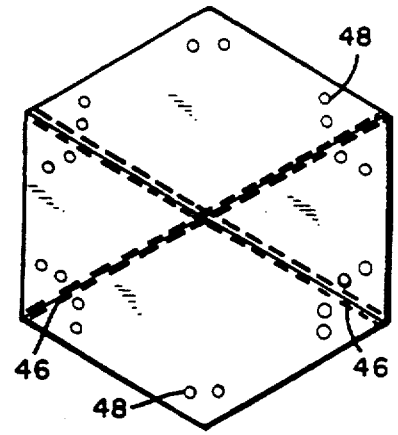
Figure 19:
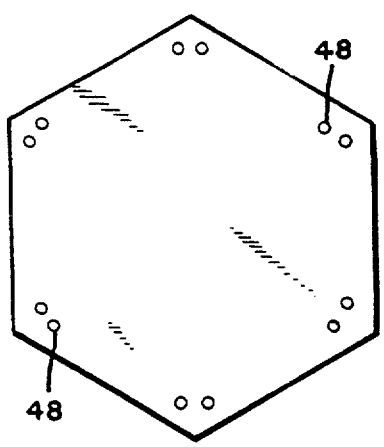
Figure 20:
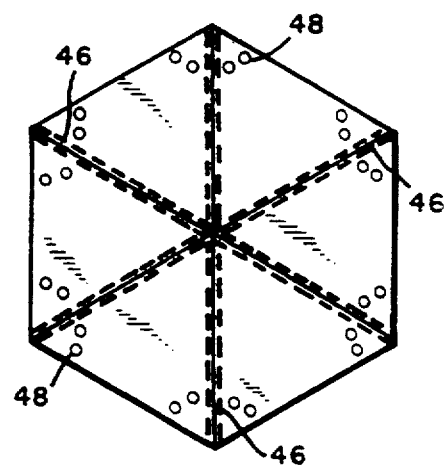
Figure 21:
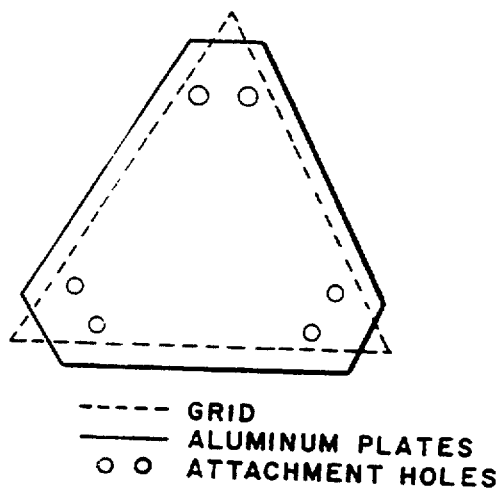
Figure 23:
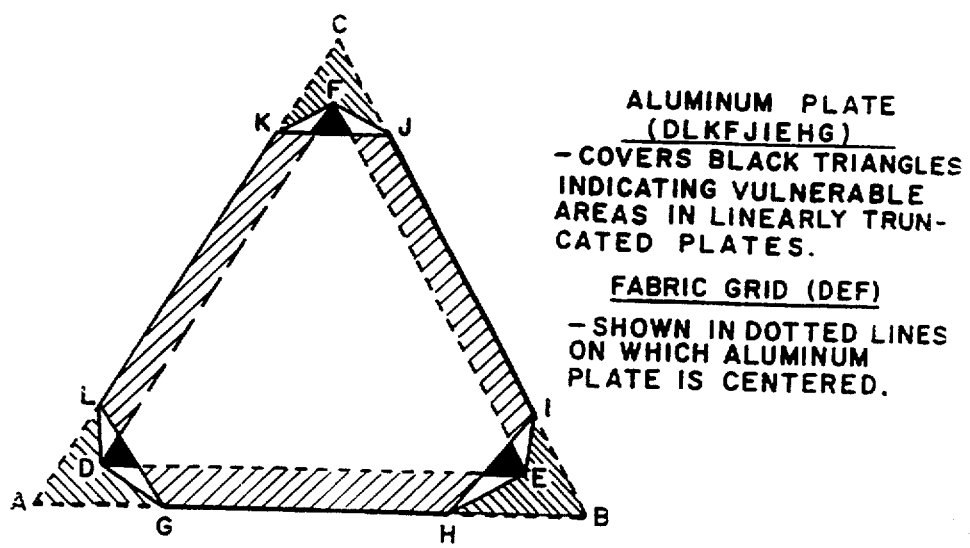
Figure 22:
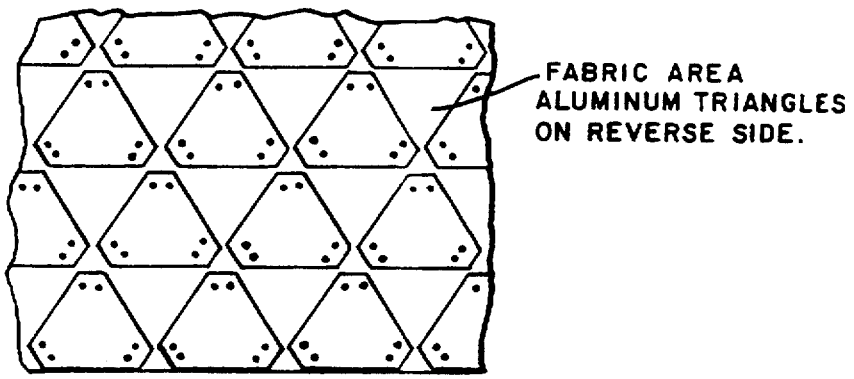
Figure 22:
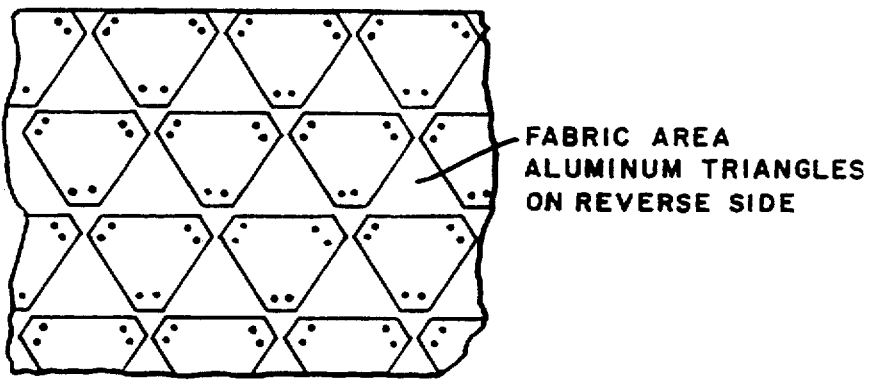

Aluminum hexagons having side length of 1.5 inches (3.8 cm) and thickness of 0.05 inches (0.27 cm), were placed on a cotton fabric in the pattern shown in FIGS. 26 and 27. A sheet of fabric adhesive (Wonder-Pellon Under Transfer Web, a product of Freudenberg Nonwovens) and an identical cotton fabric layer were placed over the metal plates. The top and bottom fabrics were laminated together in the triangular areas not occupied by metal plates with heat and pressure using a conventional clothes iron and appropriately sized aluminium triangles as temporary backing during the ironing operation.

H. Composite 9

Aluminum hexagons having side lengths of 1.5 inches (3.8 cm) and thickness of 0.05 inches (0.127 cm) were placed on a cotton fabric in the pattern shown in FIG. 27. A sheet of fabric adhesive (Wonder-Pellon Under Transfer Web, a product of Freudenberg Nonwovens) and an identical cotton fabric layer were placed over the metal plates. The top and bottom fabrics were laminated together in the triangular areas not occupied by metal plates with heat and pressure using a conventional clothes iron and appropriately sized aluminium triangles as backing as depicted in FIG. 28 (b).

Two similar panels were constructed which incorporated aluminum triangles in the arrangement shown in FIGS. 26(b) and 26(c) between a top and bottom fabric layers were laminated together in the hexagonal areas not occupied by metal plates in an arrangement similar to FIG. 27(b). The aluminum equilateral triangles had side lengths of 1.9 inches (4.83 cm) before truncation and 1.4 (3.56 cm) inches after linear truncation.

The three panels, one with isolated hexagons and two with isolated triangles, were placed together with the panel containing the hexagons in the central position and sewn around three sides of the perimeter to create a panel 14 inches (35.6 cm) square which provided complete areal coverage by the metal plates.

I. Evaluation of Composites

A. Flexibility

1. Drape Test 1

Composites were evaluated in Drape Test 1. The results are set forth in the following Table I. The results are expressed as the ratio of the extent to which end of the composite drops from the plane of the support (H) to the length of the composite extending from the support (L), or H/L.

TABLE I

| EXP. NO. | SAMPLE | Flexibility of Composites Drape Test 1 H/L | | | | |
|---|---|---|---|---|---|---|
| | | 0° | 30° | 45° | 60° | 90° |
| 1 | Comp Composite 1 | 0.91 | 0.90 | 0.91 | 0.93 | 0.86 |
| 2 | Comp Composite 2 | 0.80 | 0.75 | 0.77 | 0.84 | 0.70 |
| 3 | Composite 1 | 0.93 | 0.86 | 0.85 | 0.94 | 0.83 |
| 4 | Composite 2 | 0.92 | 0.79 | 0.75 | 0.96 | 0.76 |
| 5 | Composite 3 | 0.92 | 0.90 | 0.85 | 0.97 | 0.93 |
| 6 | Composite 4 | 0.91 | 0.79 | 0.77 | 0.93 | 0.89 |
| 7 | Composite 5 | 0.93 | 0.83 | 0.81 | 0.96 | 0.73 |
| 8 | Composite 6 | 0.90 | 0.81 | 0.79 | 0.93 | 0.72 |
| 9 | Composite 7 | 0.97 | 0.72 | 0.83 | 0.99 | 0.87 |
| 10 | Composite 8 | 1.0 | 0.68 | 0.81 | 0.99 | 0.88 |

2. Drape Test 2

The composites were evaluated in Drape Test 2. The results are set forth in the following Table II.

TABLE II

| Ex. No. | Sample No. | H/L Ratio |
|---|---|---|
| 1 | Comp Composite 1 | 0.33 |
| 2 | Comp Composite 2 | 0.23 |
| 3 | Composite 1 | 0.48 |
| 4 | Composite 2 | 0.59 |
| 5 | Composite 3 | 0.34 |
| 6 | Composite 4 | 0.45 |
| 7 | Composite 5 | 0.41 |
| 8 | Composite 6 | 0.40 |

A series of experiments were carried out to estimate the level of noise generation by certain embodiments described in EXAMPLE 1. In these experiments, the level of noise generation was determined subjectively by shaking the composites and listening to the noise generated. For comparison purposes, the level of noise generated by an all fabric standard PASGT vest was evaluated as a control. The results are set forth in the following Table III.

In the Table, the relative performance of the composites was rated as follows:

a) "1" indicates that no or substantially no noise was generated which is substantialy identical to the standard PASGT vest control;

b) "2" indicates that a small amount of noise was generated as compared to the standard PASGT vest control;

c) "3" indicates that a moderate amount of noise was generated as compared to the standard PASGT vest control; and d) "4" indicates that a large amount of noise generated as compared to the standard PASGT vest control.

TABLE III

| Exp. No. | Composite | Level of Noise Generated |
|---|---|---|
| 1 | Control | 1 |
| 2 | Composite 9 | 1 |
| 3 | Composite 1 | 2 |
| 4 | Comp. Composite 1 | 3 |
| 5 | Comp. Composite 3 | 4 |

What is claimed is:

1. A flexible composite comprising one or more composite layers, at least one of said composite layers comprising at least two flexible layers each of which comprises a plurality of rigid planar bodies positioned on a surface thereof out of contact with each other forming a pattern of covered regions formed from said layers and said bodies and uncovered regions formed from said flexible layers, said flexible layers positioned such that the covered region of one flexible layer is in alignment with said uncovered region of an adjacent flexible layer such that at least about 85 area % of said uncovered of one flexible layer is aligned with said planar bodies of an adjacent flexible layer, and said flexible composite having an amount of drape of at least about 8 inches.

2. A composite as recited in claim 1 wherein said surface planar bodies are position such that said article has at least two semi-continuous or continuous seams in which seam directions intersect at an angle.

3. A composite as recited in claim 2 wherein said article has at least three seams.

4. A composite as recited in claim 3 wherein said seams are continuous.

5. A composite as recited in claim 4 wherein seam directions are at an angle.

6. A composite as recited in claim 5 wherein said angle is about 60°.

7. A composite as recited in claim 1 wherein said composite comprises one or more composite layers, at least one of said composite layers comprising a plurality of first planar bodies fixed on a surface of a first flexible layer or fixed between said first flexible layer and a second flexible layer such that each of said first bodies is isolated from and out of contact with each other of said first bodies forming a first base layer having a pattern of filled regions formed from said first flexible layer and said first bodies or formed from said first and second flexible layers and said first bodies, and unfilled regions formed from said first flexible layer or said first and second flexible layers, and a plurality of second planar bodies on a surface of said base layer, or on a surface of a third flexible layer, or fixed between said third flexible layer and a fourth flexible layer forming a second base layer such that each of said second planar bodies is isolated from and out of contact with each other of said second planar bodies and each of said first planar bodies, said second planar bodies positioned in correspondence and alignment with said unfilled regions of such base layer such that at least about 85 area % of said unfilled region is aligned with its corresponding second planar body.

8. A composite as recited in claim 7 wherein said first planar bodies and said second planar bodies are formed from a penetration resistant material.

9. A composite as recited in claim 8 wherein said first planar bodies, and said second planar bodies are the same or different and are selected from the group consisting of triangular shaped bodies, hexagonal shaped bodies or a combination thereof.

10. A composite as recited in claim 9 wherein said triangular shaped bodies are of equilateral triangular shape or substantially of equilateral triangular shape.

11. A composite as recited in claim 10 wherein said first planar bodies and said second planar bodies are of different shape.

12. A composite as recited in claim 11 wherein said first bodies are of triangular shape and said second bodies are of hexagonal shape.

13. A composite as recited in claim 11 wherein said first bodies are of hexagonal shape and said second bodies are of triangular shape.

14. A composite as recited in claim 7 wherein said first planar bodies and said second planar bodies comprise repeats of three planar bodies, at least one of said bodies being a first planar body and at least one of said bodies being a second planar body.

15. A composite as recited in claim 12 wherein said first planar bodies and said second planar bodies are of different shapes and are triangular shaped, hexagonal shaped or a combination thereof.

16. A composite as recited in claim 13 wherein said at least one composite layer comprises a plurality of first planar bodies fixed between said first and second flexible layers forming said base layer having said filled and unfilled regions.

17. A composite as recited in claim 14 wherein said second bodies cover at least about 95 area percent of the surface area said unfilled regions.

18. A composite as recited in claim 16 wherein said second planar bodies cover substantially about 100 area percent of the surface area of said unfilled regions.

19. A composite as recited in claim 13 wherein said second planar bodies are uniformly larger in surface area than said corresponding unfilled regions and wherein said second planar bodies cover 100 area percent of said unfilled regions.

20. A composite as recited in claim 17 wherein said composite comprises a plurality of second planar bodies positioned on a surface of said first base layer in alignment with said corresponding unfilled regions; or said second planar bodies are fixed between said third and fourth flexible layers forming a second base layer and wherein said first and second base layers are positioned such that the second planar bodies positioned between said third and fourth layers are in alignment with said corresponding unfilled regions.

21. A composite as recited in claim 19 wherein said second planar bodies are positioned on a surface of said first base layer.

22. A composite as recited in claim 20 wherein said first planar bodies and said second planar bodies are positioned such that said bodies form repeats of three bodies one of said bodies being a first planar body and two of said bodies being a second planar body.

23. A composite as recited in claim 21 wherein said first planar bodies are of a hexagonal shape, and said second planar bodies are of triangular shape.

24. A composite as recited in claim 20 wherein said second planar bodies are fixed between said third and fourth flexible layers.

25. A composite as recited in claim 23 wherein said first planar bodies and said second planar bodies are positioned such that said bodies form repeats of three bodies, one of said bodies being a first planar body and two of said bodies being a second planar body.

26. A composite as recited in claim 25 wherein said first planar bodies are of a hexagonal shape, and said second planar bodies are of triangular shape.

27. A composite as recited in claim 26 wherein said first, second, third and fourth flexible layers are the same or different and are comprise of a network of fibers having a tensile strength of at least about 7 grams/denier, a tensile modulus of at least about 30 grams/denier and an energy-to-break of at least about 30 joules/grams.

28. A composite as recited in claim 27 wherein said fibers have a tenacity equal to or greater than about 10 g/d, a tensile modulus equal to or greater than about 150 g/d and an energy-to-break equal to or greater than about 10 j/g.

29. A composite as recited in claim 28 wherein said tenacity is equal to or greater than about 20 g/d, said modulus is equal to or greater than about 500 g/d, and said energy-to-break is equal to or greater than about 15 j/g.

30. A composite as recited in claim 28 wherein said tenacity is equal to or greater than about 25 g/d, said modulus is equal to or greater than about 1000 g/d, and said energy-to-break is equal to or greater than about 20 j/g.

31. A composite as recited in claim 20 wherein said fibers are polyethylene fibers, glass fibers, polyester fibers, aramid fibers, nylon fibers or mixtures thereof.

32. A composite as recited in claim 31 wherein said fibers are polyethylene fibers.

33. A composite as recited in claim 31 wherein said fibers are aramid fibers.

34. A composite as recited in claim 31 wherein said fibers are a combination of polyethylene fibers and aramid fibers.

35. A composite as recited in claim 31 wherein at least one of said first, second, third and fourth flexible layers are the same or different and comprise at least one sheet-like fibers array in which said fibers are arranged substantially parallel to one another along a common fiber direction in a polymeric matrix.

36. A composite as recited in claim 35 wherein at least one of said first, second, third and fourth flexible layers comprises more than one array, with adjacent arrays aligned at an angle with respect to the common fiber direction of the parallel fibers contained in said adjacent array.

37. A composite as recited in claim 36 wherein said angle is from about 45° to about 90°.

38. A composite as recited in claim 37 wherein said angle is about 90°.

39. A composite as recited in claim 26 wherein at least one of said first, second, third and fourth layers comprises a non-woven fabric.

40. A composite as recited in claim 26 wherein of least one of said first, second, third and fourth layers as the same or different and comprise a woven fabric.

41. A composite as recited in claim 7 further comprising a cover layer and a backing layer sandwiching said one or more composite layers.

42. An article of manufacture fabricated totally or in part from the composite of claim 1.

* * * * *

UNITED STATES PATENT AND TRADEMARK OFFICE
CERTIFICATE OF CORRECTION

PATENT NO. : 5,362,527

DATED : November 8, 1994

INVENTOR(S) : Harpell et al

It is certified that error appears in the above-identified patent and that said Letters Patent is hereby corrected as shown below:

The title page, showing the illustrative figure, should be deleted and substitute therefor the attached title page.

The drawing sheets, consisting of Figs. 1 - 27, should be deleted to be replaced with the drawing sheets, consisting of Figs. 1 - 27, as shown on the attached pages.

Signed and Sealed this

Twenty-third Day of July, 1996

Attest:

BRUCE LEHMAN

Attesting Officer

Commissioner of Patents and Trademarks

United States Patent [19]
Harpell et al.

[11] Patent Number: 5,362,527
[45] Date of Patent: Nov. 8, 1994

[54] FLEXIBLE COMPOSITES HAVING RIGID ISOLATED PANELS AND ARTICLES FABRICATED FROM SAME

[75] Inventors: Gary A. Harpell; Dusan C. Prevorsek, both of Morristown; Max W. Gerlach, Hackettstown, all of N.J.

[73] Assignee: AlliedSignal Inc., Morristownship, Morris County, N.J.

[21] Appl. No.: 6,914

[22] Filed: Jan. 21, 1993

Related U.S. Application Data

[63] Continuation of Ser. No. 705,682, May 24, 1991, abandoned.

[51] Int. Cl.⁵ .................................................. F16B 2/00
[52] U.S. Cl. ........................................ 428/33; 428/53; 428/76; 428/105; 428/109; 428/110; 428/113; 428/196; 428/246; 428/252; 428/284; 428/286; 428/902; 428/911; 2/2.5
[58] Field of Search ................... 428/53, 52, 76, 105, 428/109, 110, 113, 196, 246, 252, 284, 286, 902, 911, 33; 2/2.5

[56] References Cited

U.S. PATENT DOCUMENTS

| | | | |
|---|---|---|---|
| 3,894,472 | 7/1975 | Davis | 2/2.5 |
| 4,633,528 | 1/1987 | Brandt | 2/2.5 |
| 4,660,223 | 4/1987 | Fritch | 2/2.5 |
| 4,704,943 | 11/1987 | McDougal | 428/911 |
| 4,923,728 | 5/1990 | Snedeker | 2/2.5 |
| 5,187,023 | 2/1993 | Prevorsek et al. | 428/911 |
| 5,196,252 | 3/1993 | Harpell | 428/911 |
| 5,198,280 | 3/1993 | Harpell et al. | 428/911 |

*Primary Examiner*—James J. Bell
*Attorney, Agent, or Firm*—Gus T. Hampilos

[57] ABSTRACT

A flexible article of manufacture especially suitable for use as a ballistic resistant body armor which comprises one or more composite layers, at least one of said composite layers comprising a base layer having a plurality of planar bodies positioned between two sandwiching flexible layers out of contact with each other and a plurality of planar bodies positioned on a surface of said base layer out of contact with each other and in disalignment with the sandwiched planar bodies.

42 Claims, 11 Drawing Sheets

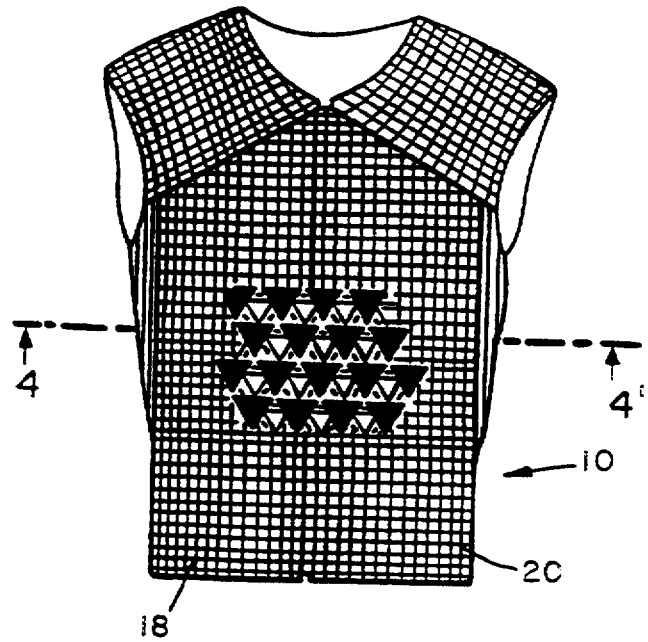

FIG. 1 (Flexibility Test)
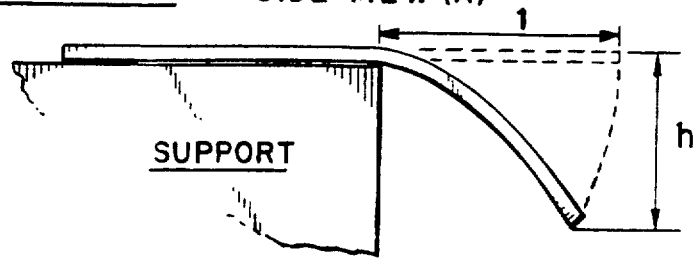
Drape Test 1 — SIDE VIEW (A)
SUPPORT
TOP VIEW (B)
0 DEGREES   45 DEGREES   90 DEGREES
FIG. 2 Flexibility Testing (Simultaneous Multiaxial)
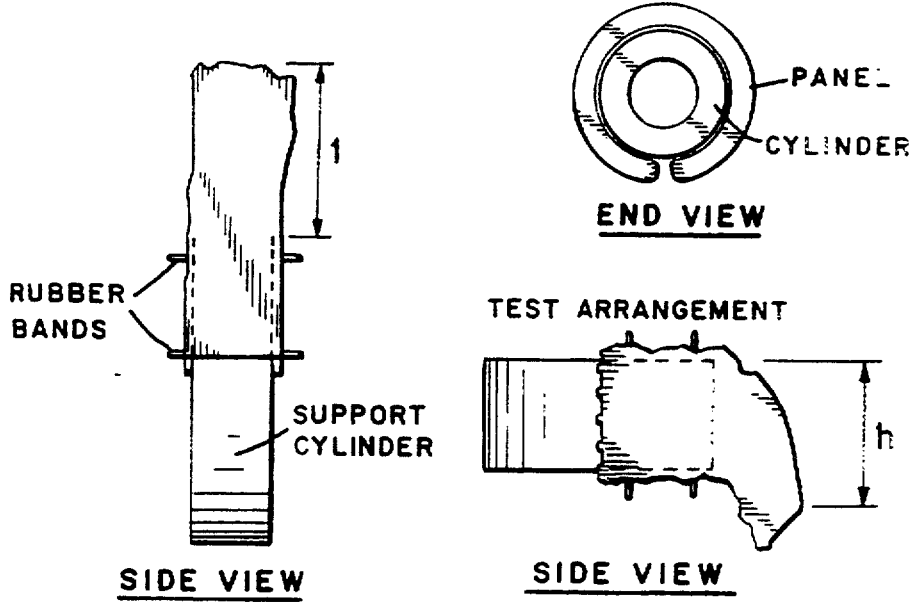
Drape Test 2   Panel Attachment to Cylinder
RUBBER BANDS
SUPPORT CYLINDER
SIDE VIEW
END VIEW
TEST ARRANGEMENT
SIDE VIEW

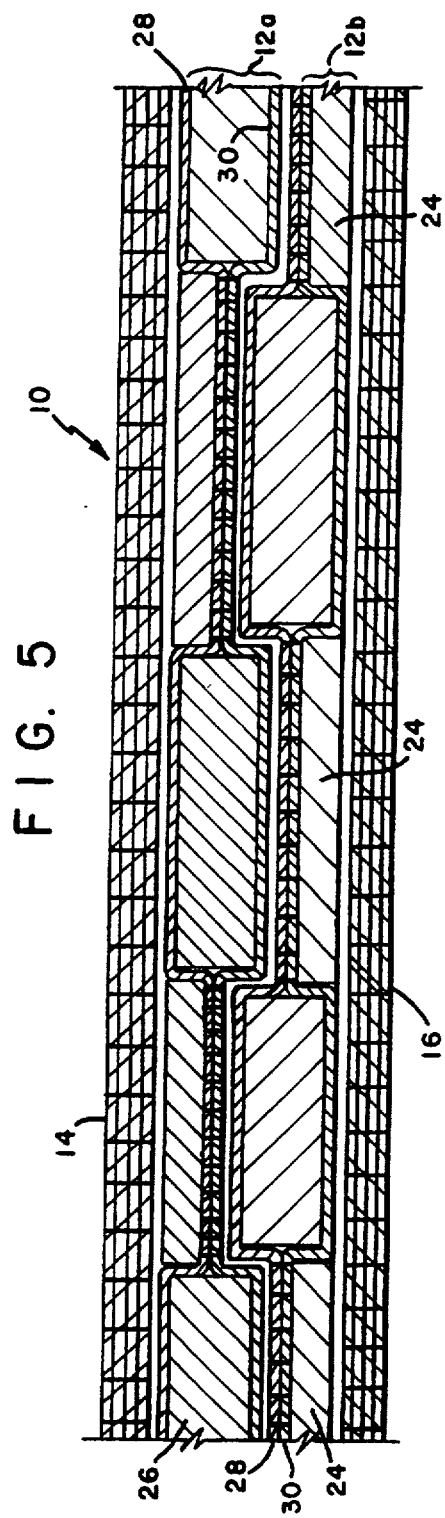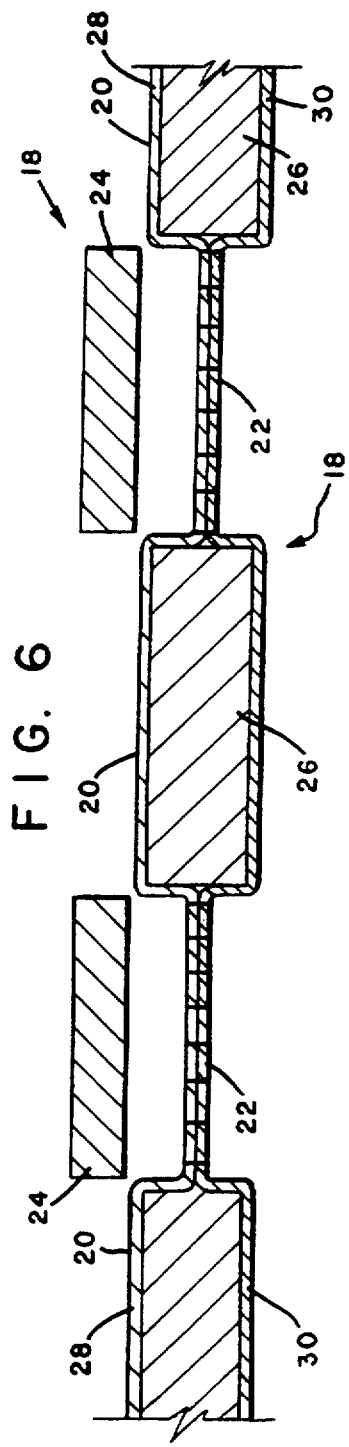

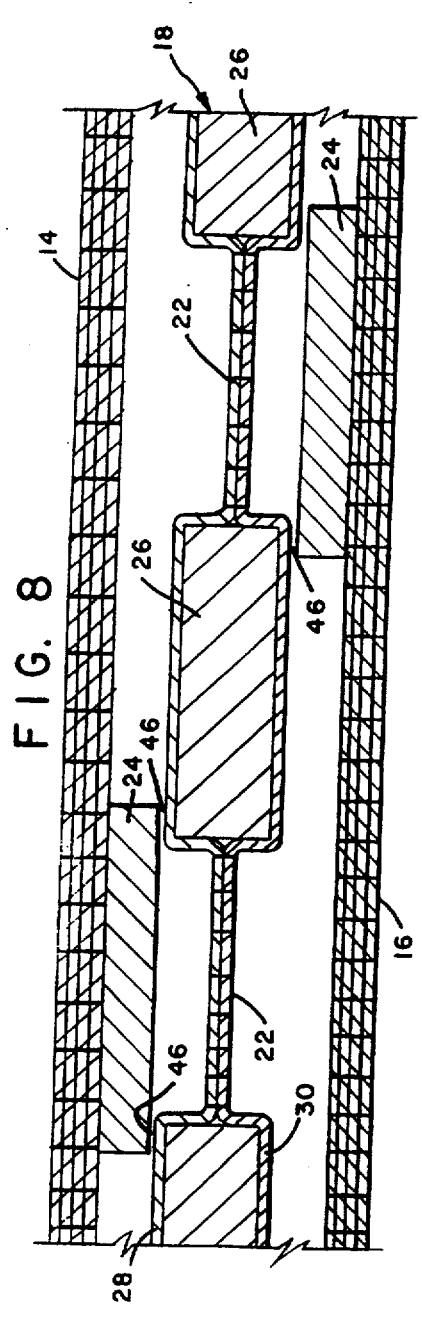
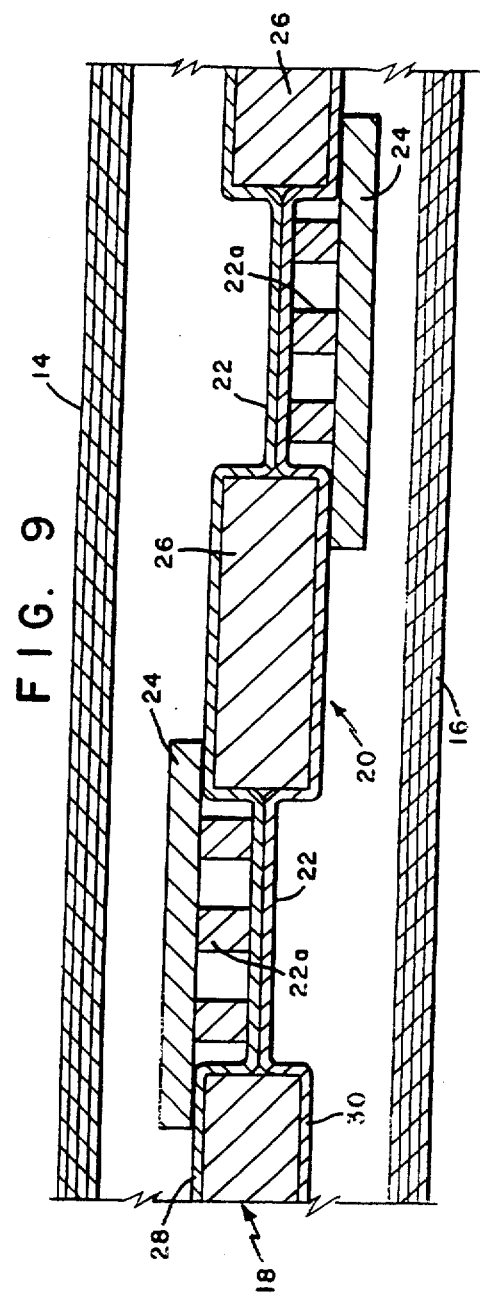

F I G. 13
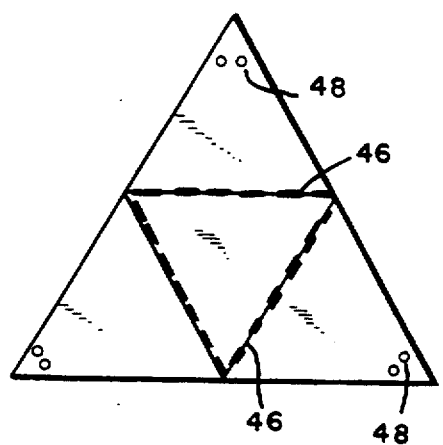
F I G. 14
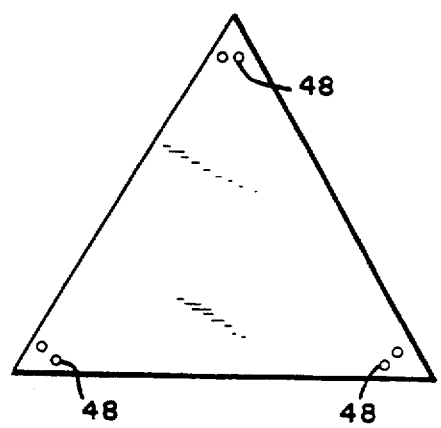
F I G. 15
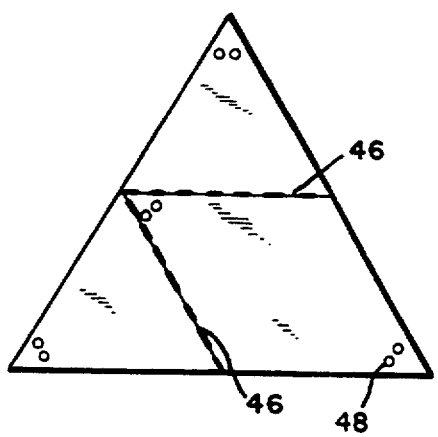
F I G. 16
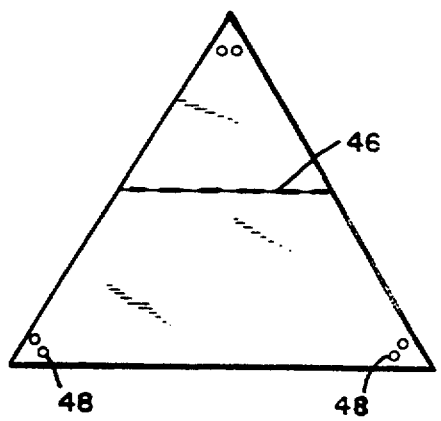

Schematic of Truncated Aluminum Triangle on Fabric Grid

- - - - GRID
——— ALUMINUM PLATES
○ ○ ATTACHMENT HOLES

Non-Linearly Truncated Aluminum Plate

ALUMINUM PLATE (DLKFJIEHG)
- COVERS BLACK TRIANGLES INDICATING VULNERABLE AREAS IN LINEARLY TRUNCATED PLATES.

FABRIC GRID (DEF)
- SHOWN IN DOTTED LINES ON WHICH ALUMINUM PLATE IS CENTERED.

Arrangement of Aluminum Triangles
Sewn Onto Nylon Fabric (1) PATTERN ON IMPACT SIDE
OF 5 LAYER FABRIC PANEL (2) PATTERN ON OPPOSITE SIDE
OF 5 LAYER FABRIC PANEL Arrangement of Asymmetric Unit of Two Equilateral Triangles and One Hexagon Sewn Onto Fabric Panels (A) SIDE 1 - TRIANGLES SEWN ONTO THIS SIDE.

(B) SIDE 2 - HEXAGONS SEWN ONTO THIS SIDE.

FIG. 26a

FLEXIBLE PANEL INCORPORATING ISOLATED PANELS

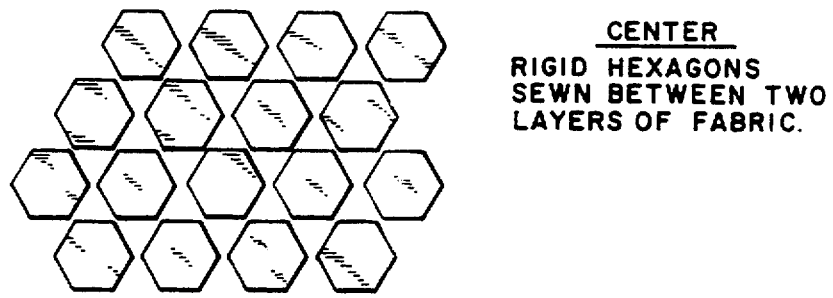

CENTER

RIGID HEXAGONS SEWN BETWEEN TWO LAYERS OF FABRIC.

FIG. 26b  FLEXIBLE PANEL INCORPORATING ISOLATED PANELS

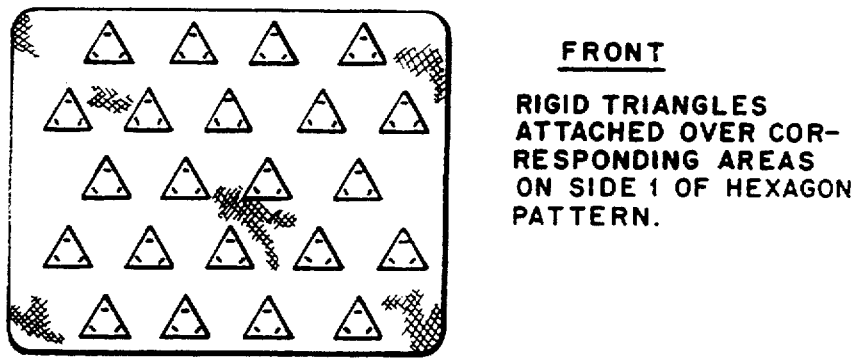

FRONT

RIGID TRIANGLES ATTACHED OVER CORRESPONDING AREAS ON SIDE 1 OF HEXAGON PATTERN.

FIG. 26c  FLEXIBLE PANEL INCORPORATING ISOLATED PANELS

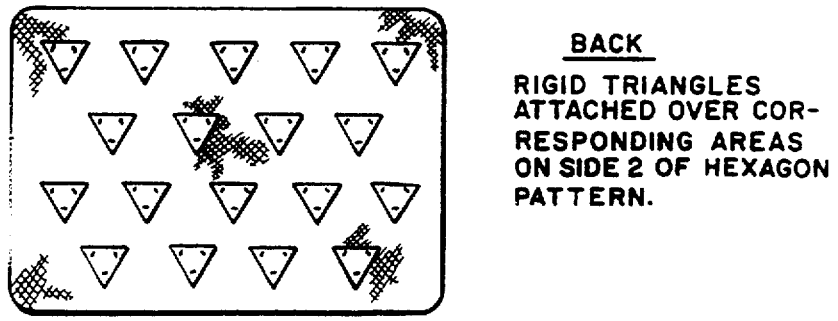

BACK

RIGID TRIANGLES ATTACHED OVER CORRESPONDING AREAS ON SIDE 2 OF HEXAGON PATTERN.

FIG. 27a (TOP VIEW)
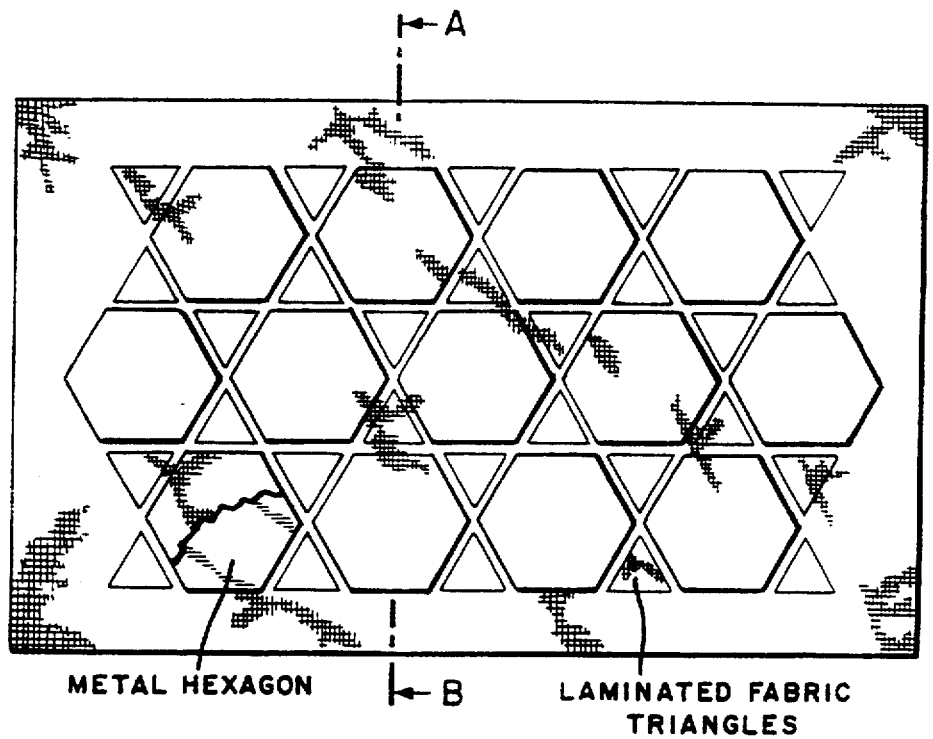
METAL HEXAGON    LAMINATED FABRIC TRIANGLES
FIG. 27b (SIDE VIEW)
SIDE VIEW OF CUT THROUGH PANEL ALONG DOTTED LINE AB.
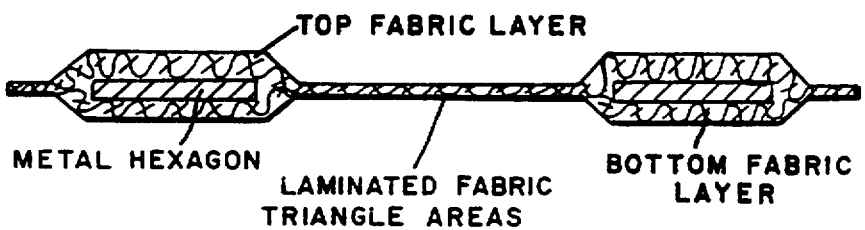
TOP FABRIC LAYER
METAL HEXAGON
LAMINATED FABRIC TRIANGLE AREAS
BOTTOM FABRIC LAYER